US012539176B2

(12) United States Patent
Sowards et al.

(10) Patent No.: US 12,539,176 B2
(45) Date of Patent: Feb. 3, 2026

(54) FIBER OPTIC ULTRASOUND PROBE

(71) Applicant: Bard Access Systems, Inc., Salt Lake City, UT (US)

(72) Inventors: Steffan Sowards, Salt Lake City, UT (US); William Robert McLaughlin, Bountiful, UT (US); Anthony K. Misener, Bountiful, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 376 days.

(21) Appl. No.: 17/965,657

(22) Filed: Oct. 13, 2022

(65) Prior Publication Data

US 2023/0121370 A1    Apr. 20, 2023

Related U.S. Application Data

(60) Provisional application No. 63/255,834, filed on Oct. 14, 2021.

(51) Int. Cl.
*A61B 34/20* (2016.01)
*A61B 8/00* (2006.01)
(Continued)

(52) U.S. Cl.
CPC ............ *A61B 34/20* (2016.02); *A61B 8/0841* (2013.01); *A61B 8/4254* (2013.01);
(Continued)

(58) Field of Classification Search
CPC .... A61B 2034/2061; A61B 2034/2063; A61B 34/20; A61B 8/0833; A61B 8/0841;
(Continued)

(56) References Cited

U.S. PATENT DOCUMENTS

| 5,325,293 A | 6/1994 | Dorne |
| 5,549,554 A | 8/1996 | Miraki |

(Continued)

FOREIGN PATENT DOCUMENTS

| CN | 101854853 A | 10/2010 |
| CN | 105054962 A | 11/2015 |

(Continued)

OTHER PUBLICATIONS

U.S. Appl. No. 17/707,662, filed Mar. 29, 2022 Advisory Action dated Feb. 23, 2024.

(Continued)

*Primary Examiner* — Brooke Lyn Klein
(74) *Attorney, Agent, or Firm* — Rutan & Tucker LLP

(57) ABSTRACT

Disclosed herein is a system that includes an ultrasound imaging probe having a first optical fiber integrated therein and a console optically coupled with the ultrasound imaging probe via a first elongate member. The console includes one or more processors and a non-transitory computer-readable medium having stored thereon logic, that when executed by the one or more processors, causes operations that can include providing an incident light signal to the first optical fiber via the first elongate member, receiving reflected light signals of different spectral widths of the incident light from the first optical fiber and the second optical fiber, processing the reflected light signals to determine a first three-dimensional (3D) shape extending along a length including at least portions of the first optical fiber and the second optical fiber, and causing rendering of an image of the first 3D shape on a display of the medical system.

16 Claims, 12 Drawing Sheets

(51) Int. Cl.
*A61B 8/08* (2006.01)
*G01H 9/00* (2006.01)
*G01S 7/62* (2006.01)
*G01S 15/89* (2006.01)

(52) U.S. Cl.
CPC ............ *A61B 8/4444* (2013.01); *A61B 8/466* (2013.01); *G01H 9/004* (2013.01); *G01S 7/6245* (2013.01); *G01S 15/8993* (2013.01); *A61B 2034/2061* (2016.02); *A61B 2034/2063* (2016.02)

(58) Field of Classification Search
CPC ..... A61B 8/4254; A61B 8/4444; A61B 8/461; A61B 8/466; G01H 9/004; G01S 15/8993; G01S 7/6245
See application file for complete search history.

(56) References Cited

U.S. PATENT DOCUMENTS

| | | | |
|---|---|---|---|
| 5,573,529 A | 11/1996 | Haak et al. | |
| 5,908,387 A | 6/1999 | LeFree et al. | |
| 5,970,119 A | 10/1999 | Hofmann | |
| 5,997,497 A | 12/1999 | Nita et al. | |
| 6,012,034 A | 1/2000 | Hamparian et al. | |
| 6,074,367 A | 6/2000 | Hubbell | |
| 6,543,642 B1 | 4/2003 | Milliorn | |
| 6,554,771 B1 | 4/2003 | Buil et al. | |
| 6,592,565 B2 | 7/2003 | Twardowski | |
| 6,601,705 B2 | 8/2003 | Molina et al. | |
| 6,612,992 B1 | 9/2003 | Hossack et al. | |
| 6,613,002 B1 | 9/2003 | Clark et al. | |
| 6,687,386 B1 | 2/2004 | Ito et al. | |
| 6,702,749 B2 | 3/2004 | Paladini et al. | |
| 6,754,608 B2 | 6/2004 | Svanerudh et al. | |
| 6,840,379 B2 | 1/2005 | Franks-Farah et al. | |
| 6,857,196 B2 | 2/2005 | Dalrymple | |
| 7,831,449 B2 | 11/2010 | Ying et al. | |
| 9,521,961 B2 | 12/2016 | Silverstein et al. | |
| 9,756,766 B2 | 9/2017 | Best | |
| 9,949,720 B2 | 4/2018 | Southard et al. | |
| 9,950,139 B2 | 4/2018 | Blanchard et al. | |
| 10,849,689 B1 | 12/2020 | Hu et al. | |
| 11,462,324 B1 | 10/2022 | Roh et al. | |
| 11,844,656 B2 | 12/2023 | Urabe et al. | |
| 11,896,425 B2 | 2/2024 | Dhatt et al. | |
| 11,974,813 B1 | 5/2024 | Donhowe et al. | |
| 2003/0028112 A1 | 2/2003 | Paladini et al. | |
| 2003/0047126 A1 | 3/2003 | Tomaschko | |
| 2003/0106825 A1 | 6/2003 | Molina et al. | |
| 2003/0120154 A1 | 6/2003 | Sauer et al. | |
| 2003/0120155 A1 | 6/2003 | Sauer et al. | |
| 2003/0199765 A1 | 10/2003 | Stetten et al. | |
| 2004/0055925 A1 | 3/2004 | Franks-Farah et al. | |
| 2005/0000975 A1 | 1/2005 | Carco et al. | |
| 2005/0165299 A1 | 7/2005 | Kressy et al. | |
| 2006/0004290 A1 | 1/2006 | Smith et al. | |
| 2006/0015039 A1 | 1/2006 | Cassidy et al. | |
| 2006/0020256 A1 | 1/2006 | Bell et al. | |
| 2007/0043341 A1 | 2/2007 | Anderson et al. | |
| 2007/0073155 A1 | 3/2007 | Park et al. | |
| 2007/0199848 A1 | 8/2007 | Ellswood et al. | |
| 2007/0239120 A1 | 10/2007 | Brock et al. | |
| 2007/0249911 A1 | 10/2007 | Simon | |
| 2007/0260213 A1 | 11/2007 | Williams et al. | |
| 2008/0009747 A1 | 1/2008 | Saadat et al. | |
| 2008/0033293 A1 | 2/2008 | Beasley et al. | |
| 2008/0033759 A1 | 2/2008 | Finlay | |
| 2008/0051657 A1 | 2/2008 | Rold | |
| 2008/0058963 A1 | 3/2008 | Garibaldi et al. | |
| 2008/0161687 A1 | 7/2008 | Suri et al. | |
| 2008/0177186 A1 | 7/2008 | Slater et al. | |
| 2008/0218743 A1 | 9/2008 | Stetten et al. | |
| 2008/0300491 A1 | 12/2008 | Bonde et al. | |
| 2009/0143672 A1 | 6/2009 | Harms et al. | |
| 2009/0143684 A1 | 6/2009 | Cermak et al. | |
| 2009/0156926 A1 | 6/2009 | Messerly et al. | |
| 2009/0182224 A1 | 7/2009 | Shmarak et al. | |
| 2009/0221908 A1 | 9/2009 | Glossop | |
| 2009/0234328 A1 | 9/2009 | Cox et al. | |
| 2009/0306509 A1 | 12/2009 | Pedersen et al. | |
| 2010/0080427 A1 | 4/2010 | Yeluri et al. | |
| 2010/0106015 A1 | 4/2010 | Norris | |
| 2010/0106056 A1 | 4/2010 | Norris | |
| 2010/0211026 A2 | 8/2010 | Sheetz et al. | |
| 2010/0305442 A1 | 12/2010 | Tierney et al. | |
| 2010/0312121 A1 | 12/2010 | Guan | |
| 2011/0028847 A1 | 2/2011 | Whitmore, III et al. | |
| 2011/0071404 A1 | 3/2011 | Schmitt et al. | |
| 2011/0166451 A1 | 7/2011 | Blaivas et al. | |
| 2011/0245659 A1 | 10/2011 | Ma et al. | |
| 2011/0295108 A1 | 12/2011 | Cox et al. | |
| 2011/0313293 A1 | 12/2011 | Lindekugel et al. | |
| 2012/0078103 A1 | 3/2012 | Tashiro et al. | |
| 2012/0143029 A1 | 6/2012 | Silverstein et al. | |
| 2012/0165679 A1 | 6/2012 | Orome et al. | |
| 2012/0197132 A1 | 8/2012 | O'Connor | |
| 2012/0253200 A1 | 10/2012 | Stolka et al. | |
| 2013/0006102 A1 | 1/2013 | Wilkes et al. | |
| 2013/0102889 A1 | 4/2013 | Southard et al. | |
| 2013/0131499 A1 | 5/2013 | Chan et al. | |
| 2013/0218024 A1 | 8/2013 | Boctor et al. | |
| 2013/0261553 A1 | 10/2013 | Sheldon et al. | |
| 2014/0155744 A1 | 6/2014 | Pameijer | |
| 2014/0275997 A1 | 9/2014 | Chopra et al. | |
| 2014/0287393 A1 | 9/2014 | Kumar et al. | |
| 2014/0303423 A1 | 10/2014 | Amthor et al. | |
| 2014/0343406 A1 | 11/2014 | Damjanovic | |
| 2015/0148668 A1 | 5/2015 | Stolka et al. | |
| 2015/0182144 A1* | 7/2015 | Bharat | A61N 5/1027 600/424 |
| 2015/0216442 A1 | 8/2015 | Lavy et al. | |
| 2015/0250437 A1 | 9/2015 | Zaiki | |
| 2015/0272553 A1 | 10/2015 | Thattari Kandiyil et al. | |
| 2015/0320325 A1 | 11/2015 | Sheehan et al. | |
| 2015/0320481 A1 | 11/2015 | Cosman, Jr. et al. | |
| 2015/0359991 A1 | 12/2015 | Dunbar et al. | |
| 2016/0051224 A1 | 2/2016 | Striano | |
| 2016/0128719 A1 | 5/2016 | Cermak | |
| 2016/0174937 A1 | 6/2016 | Bakshi et al. | |
| 2016/0213398 A1 | 7/2016 | Liu | |
| 2016/0300120 A1 | 10/2016 | Haas et al. | |
| 2016/0302772 A1 | 10/2016 | Cummins et al. | |
| 2016/0331469 A1* | 11/2016 | Hall | A61B 8/12 |
| 2016/0374644 A1 | 12/2016 | Mauldin, Jr. et al. | |
| 2017/0035514 A1 | 2/2017 | Fox et al. | |
| 2017/0056062 A1 | 3/2017 | Buljubasic | |
| 2017/0079551 A1 | 3/2017 | Henkel et al. | |
| 2017/0188990 A1 | 7/2017 | Von Allmen et al. | |
| 2017/0245831 A1 | 8/2017 | Nishigaki et al. | |
| 2017/0265946 A1* | 9/2017 | Ramachandran | A61B 8/4254 |
| 2017/0290563 A1* | 10/2017 | Cole | A61M 25/0147 |
| 2018/0015256 A1 | 1/2018 | Southard et al. | |
| 2018/0036084 A1 | 2/2018 | Krimsky | |
| 2018/0061546 A1 | 3/2018 | Ma et al. | |
| 2018/0125450 A1 | 5/2018 | Blackbourne et al. | |
| 2018/0132944 A1 | 5/2018 | Yan et al. | |
| 2018/0228465 A1 | 8/2018 | Southard et al. | |
| 2018/0289929 A1 | 10/2018 | Ma et al. | |
| 2018/0310955 A1 | 11/2018 | Lindekugel et al. | |
| 2019/0000478 A1 | 1/2019 | Messerly et al. | |
| 2019/0026438 A1 | 1/2019 | Ma et al. | |
| 2019/0105017 A1 | 4/2019 | Hastings | |
| 2019/0282262 A1 | 9/2019 | Bouazza-Marouf et al. | |
| 2019/0298278 A1 | 10/2019 | Nachabe et al. | |
| 2019/0374290 A1 | 12/2019 | Stolka et al. | |
| 2020/0090331 A1 | 3/2020 | Mansi et al. | |
| 2020/0113540 A1 | 4/2020 | Gijsbers et al. | |
| 2020/0219258 A1 | 7/2020 | Saget et al. | |
| 2020/0230391 A1 | 7/2020 | Burkholz et al. | |
| 2020/0234812 A1 | 7/2020 | Willybiro et al. | |
| 2020/0237403 A1 | 7/2020 | Southard et al. | |
| 2020/0245969 A1 | 8/2020 | Tung et al. | |

(56) References Cited

U.S. PATENT DOCUMENTS

| | | |
|---|---|---|
| 2020/0275949 A1 | 9/2020 | Masotti et al. |
| 2020/0297235 A1 | 9/2020 | Sanchez et al. |
| 2020/0315592 A1 | 10/2020 | Soleimani et al. |
| 2020/0359990 A1 | 11/2020 | Poland et al. |
| 2021/0015448 A1 | 1/2021 | Sokulin et al. |
| 2021/0045717 A1 | 2/2021 | Schwab |
| 2021/0059636 A1 | 3/2021 | Durfee et al. |
| 2021/0085282 A1 | 3/2021 | Prince |
| 2021/0138130 A1 | 5/2021 | Kotanko et al. |
| 2021/0169585 A1 | 6/2021 | Prince et al. |
| 2021/0186456 A1 | 6/2021 | Prince |
| 2021/0186467 A1 | 6/2021 | Urabe et al. |
| 2021/0201080 A1 | 7/2021 | Kitahara |
| 2021/0275256 A1 | 9/2021 | Sowards et al. |
| 2021/0315542 A1 | 10/2021 | Oura et al. |
| 2021/0322106 A1 | 10/2021 | Mo et al. |
| 2022/0013218 A1 | 1/2022 | Cousin |
| 2022/0022969 A1 | 1/2022 | Misener |
| 2022/0027257 A1 | 1/2022 | Harutyunyan et al. |
| 2022/0039685 A1 | 2/2022 | Misener et al. |
| 2022/0054869 A1 | 2/2022 | Stein et al. |
| 2022/0096797 A1 | 3/2022 | Prince |
| 2022/0101980 A1 | 3/2022 | Rothenberg et al. |
| 2022/0104886 A1 | 4/2022 | Blanchard et al. |
| 2022/0117582 A1 | 4/2022 | McLaughlin et al. |
| 2022/0142608 A1 | 5/2022 | Matsumoto |
| 2022/0160434 A1 | 5/2022 | Messerly et al. |
| 2022/0189610 A1 | 6/2022 | Long et al. |
| 2022/0230714 A1 | 7/2022 | Batman et al. |
| 2022/0241014 A1 | 8/2022 | Kleyman et al. |
| 2022/0280246 A1 | 9/2022 | Messerly et al. |
| 2022/0304652 A1 | 9/2022 | Peterson et al. |
| 2022/0392642 A1 | 12/2022 | Dasi et al. |
| 2022/0401157 A1 | 12/2022 | Sowards et al. |
| 2022/0406460 A1 | 12/2022 | Golan et al. |
| 2023/0030941 A1 | 2/2023 | Han |
| 2023/0147164 A1 | 5/2023 | Sowards et al. |
| 2023/0148993 A1 | 5/2023 | Sowards et al. |
| 2023/0225702 A1 | 7/2023 | Sakalauskas |
| 2023/0260107 A1 | 8/2023 | Dhatt et al. |
| 2023/0329748 A1 | 10/2023 | Sowards et al. |
| 2023/0338003 A1 | 10/2023 | Misener et al. |
| 2023/0380906 A1 | 11/2023 | Misener et al. |
| 2023/0404683 A1 | 12/2023 | Schmidt et al. |
| 2023/0420105 A1 | 12/2023 | Misener et al. |
| 2024/0008894 A1 | 1/2024 | Sowards et al. |
| 2024/0156429 A1 | 5/2024 | Dhatt et al. |
| 2024/0245386 A1 | 7/2024 | Prince |
| 2024/0249831 A1 | 7/2024 | Jesneck et al. |
| 2024/0274297 A1 | 8/2024 | Sillesen et al. |
| 2024/0390605 A1 | 11/2024 | Burkholz et al. |
| 2024/0416077 A1 | 12/2024 | Andersen et al. |
| 2025/0000585 A1 | 1/2025 | Sinha et al. |
| 2025/0255576 A1 | 8/2025 | Prince |

FOREIGN PATENT DOCUMENTS

| | | | |
|---|---|---|---|
| CN | 216167530 U | 4/2022 | |
| EP | 1504713 A1 | 2/2005 | |
| EP | 0788329 B1 | 12/2006 | |
| JP | 2018175547 A | 11/2018 | |
| KR | 20180070878 A | 6/2018 | |
| WO | 2013059714 A1 | 4/2013 | |
| WO | WO-2014053934 A1 * | 4/2014 | ............. A61B 34/20 |
| WO | 2015/017270 A1 | 2/2015 | |
| WO | 2018/026878 A1 | 2/2018 | |
| WO | 2019/232451 A1 | 12/2019 | |
| WO | 2020/002620 A1 | 1/2020 | |
| WO | 2020150501 A1 | 7/2020 | |
| WO | 2020160550 A1 | 8/2020 | |
| WO | 2020/186198 A1 | 9/2020 | |
| WO | 2021113733 A1 | 6/2021 | |
| WO | 2022/067101 A1 | 3/2022 | |
| WO | 2022/072727 A2 | 4/2022 | |
| WO | 2022/081904 A1 | 4/2022 | |
| WO | 2022150411 A1 | 7/2022 | |
| WO | 2022/187701 A1 | 9/2022 | |
| WO | 2022212414 A1 | 10/2022 | |
| WO | 2022271728 A1 | 12/2022 | |
| WO | 2023064492 A1 | 4/2023 | |
| WO | 2023081414 A1 | 5/2023 | |
| WO | 2023091427 A1 | 5/2023 | |
| WO | 2023205019 A1 | 10/2023 | |
| WO | 2023205052 A1 | 10/2023 | |
| WO | 2023230284 A1 | 11/2023 | |
| WO | 2023244640 A1 | 12/2023 | |
| WO | 2023250001 A1 | 12/2023 | |
| WO | 2024010874 A1 | 1/2024 | |

OTHER PUBLICATIONS

U.S. Appl. No. 17/707,662, filed Mar. 29, 2022 Final Office Action dated Apr. 22, 2024.

U.S. Appl. No. 17/724,371, filed Apr. 19, 2022 Final Office Action dated Jul. 24, 2024.

U.S. Appl. No. 17/724,371, filed Apr. 19, 2022 Non-Final Office Action dated Apr. 12, 2024.

U.S. Appl. No. 17/725,370, filed Apr. 20, 2022 Final Office Action dated Feb. 15, 2024.

U.S. Appl. No. 17/825,976, filed May 26, 2022 Restriction Requirement dated Apr. 12, 2024.

U.S. Appl. No. 17/849,455, filed Jun. 24, 2022 Non-Final Office Action dated Jul. 18, 2024.

U.S. Appl. No. 17/859,980, filed Jul. 7, 2022 Non-Final Office Action dated Jul. 1, 2024.

U.S. Appl. No. 17/112,725, filed Dec. 4, 2020 Final Office Action dated Apr. 14, 2023.

U.S. Appl. No. 17/485,035, filed Sep. 24, 2021 Non-Final Office Action dated May 3, 2023.

U.S. Appl. No. 17/725,370, filed Apr. 20, 2022 Restriction Requirement dated Apr. 27, 2023.

Beigi, P. et al., "Enhancement of needle visualization and localization in ultrasound." International Journal of Computer Assisted Radiology and Surgery, vol. 16, No. 130, Sep. 2020 [Sep. 30, 2020] pp. 169-178.

PCT/US2023/018340 filed Apr. 12, 2023 International Seach Report and Written Opinion dated Jul. 20, 2023.

PCT/US2023/018680 filed Apr. 14, 2023 International Seach Report and Written Opinion dated Aug. 11, 2013.

PCT/US2023/023616 filed May 25, 2023 International Search Report and Written Opinion dated Aug. 16, 2023.

PCT/US2023/025259 filed Jun. 14, 2023 International Search Report and Written Opinion dated Sep. 25, 2023.

PCT/US2023/025845 filed Jun. 21, 2023 International Search Report and Written Opinion dated Sep. 26, 2023.

U.S. Appl. No. 17/725,370, filed Apr. 20, 2022 Non-Final Office Action dated Aug. 4, 2023.

PCT/US2022/046606 filed Oct. 13, 2022 International Search Report and Written Opinion dated Feb. 6, 2023.

PCT/US2022/049042 filed Nov. 4, 2022 International Search Report and Written Opinion dated Mar. 1, 2023.

PCT/US2022/049989 filed Nov. 15, 2022 International Search Report and Written Opinion dated Feb. 6, 2023.

PCT/US2023/027042 filed Jul. 6, 2023 International Search Report and Written Opinion dated Oct. 10, 2023.

Schmidt G A et al Ultrasound-guided 1-22 vascular access in critical illness Intensive Care Medicine Springer Berlin Heidelberg Berlin/Heidelberg vol. 45 No. 4 Feb. 18, 2019 Feb. 18, 2019 pp. 434-446 XP036747615 ISSN 0342-4642 DOI 10.1007/S00134-019-05564-7 retrieved on Feb. 181, 2019.

U.S. Appl. No. 17/485,035, filed Sep. 24, 2021 Notice of Allowance dated Nov. 8, 2023.

U.S. Appl. No. 17/707,662, filed Mar. 29, 2022 Final Office Action dated Dec. 20, 2023.

U.S. Appl. No. 17/707,662, filed Mar. 29, 2022 Non-Final Office Action dated Oct. 17, 2023.

U.S. Appl. No. 17/707,662, filed Mar. 29, 2022 Examiner's Answer dated Oct. 23, 2024.

(56) References Cited

OTHER PUBLICATIONS

U.S. Appl. No. 17/724,371, filed Apr. 19, 2022 Advisory Action dated Sep. 20, 2024.
U.S. Appl. No. 17/725,370, filed Apr. 20, 2022 Notice of Allowance dated Sep. 18, 2024.
U.S. Appl. No. 17/825,976, filed May 26, 2022 Non-Final Office Action dated Oct. 4, 2024.
U.S. Appl. No. 17/981,313, filed Nov. 4, 2022 Non-Final Office Action dated Oct. 8, 2024.
U.S. Appl. No. 18/601,980, filed Mar. 11, 2024 Non-Final Office Action dated Sep. 27, 2024.
Murphy, Ethan K., et al., "Phantom Studies of Fused-Data TREIT Using Only Biopsy-Probe Electrodes" IEEE Transactions on Medical Imaging, IEEE, USA. vol. 39 No. 114, May 2020. (May 4, 2020).
PCT/US2012/061182 International Seach Report and Written Opinion dated Mar. 11, 2013.
PCT/US2020/063441 filed Dec. 4, 2020 International Preliminary Report on Patentability dated May 17, 2022.
PCT/US2020/063441 filed Dec. 4, 2020 International Search Report and Written Opinion dated Mar. 19, 2021.
PCT/US2021/052055 filed Sep. 24, 2021 International Search Report and Written Opinion dated Dec. 20, 2021.
PCT/US2022/019017 filed Mar. 4, 2022 International Search Report and Written Opinion dated Jun. 14, 2022.
PCT/US2022/022400 filed Mar. 29, 2022 International Search Report and Written Opinion dated Jul. 8, 2022.
PCT/US2022/034380 filed Jun. 21, 2022 International Search Report and Written Opinion dated Oct. 5, 2022.
Sebastian Vogt: "Real-Time Augmented Reality for Image-Guided Interventions", Oct. 5, 2009, XPO55354720, Retrieved from the Internet: URL: https://opus4.kobv.de/opus4-fau/frontdoor/deliver/index/docId/1235/file/SebastianVogtDissertation.pdf.
U.S. Appl. No. 13/656,563, filed Oct. 19, 2012 Decision on Appeal dated Nov. 1, 2017.
U.S. Appl. No. 13/656,563, filed Oct. 19, 2012 Examiner's Answer dated Nov. 16, 2015.
U.S. Appl. No. 13/656,563, filed Oct. 19, 2012 Final Office Action dated Dec. 5, 2014.
U.S. Appl. No. 13/656,563, filed Oct. 19, 2012 Non-Final Office Action dated Jul. 18, 2014.
U.S. Appl. No. 15/951,903, filed Apr. 12, 2018 Advisory Action dated Dec. 22, 2020.
U.S. Appl. No. 15/951,903, filed Apr. 12, 2018 Board Decision dated Apr. 20, 2022.
U.S. Appl. No. 15/951,903, filed Apr. 12, 2018 Examiner's Answer dated Jun. 3, 2021.
U.S. Appl. No. 15/951,903, filed Apr. 12, 2018 Final Office Action dated Oct. 13, 2020.
U.S. Appl. No. 15/951,903, filed Apr. 12, 2018 Non-Final Office Action dated May 22, 2020.
U.S. Appl. No. 15/951,903, filed Apr. 12, 2018 Notice of Allowance dated May 2, 2022.
U.S. Appl. No. 17/112,735, filed Dec. 4, 2022 Non-Final Office Action dated Oct. 26, 2022.
William F Garrett et al: "Real-time incremental visualization of dynamic ultrasound volumes using parallel BSP trees", Visualization '96. Proceedings, IEEE, NE, Oct. 27, 1996, pp. 235-ff, XPO58399771, ISBN: 978-0-89791-864-0 abstract, figures 1-7, pp. 236-240.
PCT/US2023/025845 filed Jun. 21, 2023 International Preliminary Report on Patentability dated Dec. 18, 2024.
U.S. Appl. No. 17/687,476, filed Mar. 4, 2022 Non-Final Office Action dated Nov. 1, 2024.
U.S. Appl. No. 17/687,476, filed Mar. 4, 2022 Notice of Allowance dated Mar. 5, 2025.
U.S. Appl. No. 17/724,371, filed Apr. 19, 2022 Final Office Action dated Mar. 7, 2025.
U.S. Appl. No. 17/724,371, filed Apr. 19, 2022 Non-Final Office Action dated Nov. 26, 2024.
U.S. Appl. No. 17/825,976, filed May 26, 2022 Final Office Action dated Mar. 25, 2025.
U.S. Appl. No. 17/841,541, filed Jun. 15, 2022 Non-Final Office Action dated Mar. 14, 2025.
U.S. Appl. No. 17/845,818, filed Jun. 21, 2022 Restriction Requirement dated Feb. 10, 2025.
U.S. Appl. No. 17/849,455, filed Jun. 24, 2022 Advisory Action dated Dec. 17, 2024.
U.S. Appl. No. 17/849,455, filed Jun. 24, 2022 Final Office Action dated Nov. 7, 2024.
U.S. Appl. No. 17/849,455, filed Jun. 24, 2022 Non-Final Office Action dated Jan. 24, 2025.
U.S. Appl. No. 17/859,980, filed Jul. 7, 2022 Advisory Action dated Feb. 10, 2025.
U.S. Appl. No. 17/859,980, filed Jul. 7, 2022 Final Office Action dated Dec. 5, 2024.
U.S. Appl. No. 17/987,717, filed Nov. 15, 2022 Non-Final Office Action dated Mar. 21, 2025.
U.S. Appl. No. 18/601,980, filed Mar. 11, 2024 Notice of Allowance dated Jan. 10, 2025.
U.S. Appl. No. 17/724,371, filed Apr. 19, 2022 Advisory Action dated May 14, 2025.
U.S. Appl. No. 17/724,371, filed Apr. 19, 2022 Non-Final Office Action dated Jun. 12, 2025.
U.S. Appl. No. 17/825,976, filed May 26, 2022 Advisory Action dated Jun. 9, 2025.
U.S. Appl. No. 17/845,818, filed Jun. 21, 2022 Non-Final Office Action dated Jun. 17, 2025.
U.S. Appl. No. 17/849,455, filed Jun. 24, 2022 Final Office Action dated May 7, 2025.
U.S. Appl. No. 17/859,980, filed Jul. 7, 2022 Non-Final Office Action dated May 29, 2025.
U.S. Appl. No. 17/981,313, filed Nov. 4, 2022 Advisory Action dated Jun. 26, 2025.
U.S. Appl. No. 17/981,313, filed Nov. 4, 2022 Final Office Action dated Apr. 15, 2025.
U.S. Appl. No. 17/825,976, filed May 26, 2022 Non-Final Office Action dated Aug. 5, 2025.
U.S. Appl. No. 17/841,541, filed Jun. 15, 2022 Final Office Action dated Jul. 23, 2025.
U.S. Appl. No. 17/849,455, filed Jun. 24, 2022 Advisory Action dated Jul. 11, 2025.
U.S. Appl. No. 17/849,455, filed Jun. 24, 2022 Non-Final Office Action dated Sep. 5, 2025.
U.S. Appl. No. 17/981,313, filed Nov. 4, 2022 Non-Final Office Action dated Jul. 22, 2025.
U.S. Appl. No. 17/987,717, filed Nov. 15, 2022 Notice of Allowance dated Jul. 15, 2025.
U.S. Appl. No. 17/707,662, filed Mar. 29, 2022 Board Decision dated Nov. 26, 2025.
U.S. Appl. No. 17/724,371, filed Apr. 19, 2022 Final Office Action dated Oct. 29, 2025.
U.S. Appl. No. 17/841,541, filed Jun. 15, 2022 Non-Final Office Action dated Dec. 1, 2025.
U.S. Appl. No. 17/845,818, filed Jun. 21, 2022 Notice of Allowance dated Oct. 28, 2025.
U.S. Appl. No. 17/859,980, filed Jul. 7, 2022 Final Office Action dated Oct. 16, 2025.

* cited by examiner

FIBER OPTIC ULTRASOUND PROBE

PRIORITY

This application claims the benefit of priority to U.S. Provisional Application No. 63/255,834, filed Oct. 14, 2021, which is incorporated by reference in its entirety into this application.

BACKGROUND

In the past, certain intravascular guidance of medical devices, such as guidewires and catheters for example, have used fluoroscopic methods for tracking tips of the medical devices and determining whether distal tips are appropriately localized in their target anatomical structures. However, such fluoroscopic methods expose patients and their attending clinicians to harmful X-ray radiation. Moreover, in some cases, the patients are exposed to potentially harmful contrast media needed for the fluoroscopic methods.

More recently, electromagnetic tracking systems have been used involving stylets. Generally, electromagnetic tracking systems feature three components: a field generator, a sensor unit and control unit. The field generator uses several coils to generate a position-varying magnetic field, which is used to establish a coordinate space. Attached to the stylet, such as near a distal end (tip) of the stylet for example, the sensor unit includes small coils in which current is induced via the magnetic field. Based on the electrical properties of each coil, the position and orientation of the medical device may be determined within the coordinate space. The control unit controls the field generator and captures data from the sensor unit.

Although electromagnetic tracking systems avoid line-of-sight reliance in tracking the tip of a stylet while obviating radiation exposure and potentially harmful contrast media associated with fluoroscopic methods, electromagnetic tracking systems are prone to interference. More specifically, since electromagnetic tracking systems depend on the measurement of magnetic fields produced by the field generator, these systems are subject to electromagnetic field interference, which may be caused by the presence of many different types of consumer electronics such as cellular telephones. Additionally, electromagnetic tracking systems are subject to signal drop out, depend on an external sensor, and are defined to a limited depth range.

Disclosed herein is a fiber optic shape sensing system coupled with an ultrasound imaging system configured to detect a location of a medical device within the patient body by linking a 3D shape of the medical device to an ultrasound image of the patient body.

SUMMARY

Briefly summarized, embodiments disclosed herein are directed to systems, apparatus and methods for providing tracking information of a medical device using optical fiber technology. In some embodiments, a medical system comprises an ultrasound imaging probe having a first optical fiber integrated therein, wherein the first optical fiber includes a first set of one or more of core fibers, each of the first set of one or more core fibers including a first plurality of sensors distributed along a longitudinal length of a corresponding core fiber and each sensor of the first plurality of sensors being configured to (i) reflect a light signal of a different spectral width based on received incident light, and (ii) change a characteristic of the reflected light signal based on strain experienced by the optical fiber and a console optically coupled with the ultrasound imaging probe via a first elongate member that includes a second optical fiber having a second plurality of sensors, the console including one or more processors and a non-transitory computer-readable medium having stored thereon logic, when executed by the one or more processors, causes operations including: providing an incident light signal to the first optical fiber via the first elongate member, receiving reflected light signals of different spectral widths of the incident light from one or more of the first plurality of sensors or one or more of the second plurality of sensors, processing the reflected light signals associated with the first or second plurality of sensors to determine a first three-dimensional (3D) shape extending along a length including at least portions of the first optical fiber and the second optical fiber, determining a positioning of the ultrasound imaging probe based at least on the reflected light signals received from one or more of the second plurality of sensors, and causing rendering of an image on a display of the medical system in accordance with the positioning of the ultrasound imaging probe.

In some embodiments, the operations further include: determining a reference plane based at least on the reflected light signals received from one or more of the first plurality of sensors, defining an orientation of the reference plane with respect to the imaging probe, and causing rendering of the image on the display in accordance with the orientation of the reference plane.

The system may further comprise a second elongate member including a third optical fiber and extending from the console to a medical device, wherein the second elongate member is optically coupled to the console, wherein the third optical fiber includes a third set of one or more of core fibers, each of the third set of one or more core fibers including a third plurality of sensors distributed along a longitudinal length of a corresponding core fiber and each sensor of the third plurality of sensors being configured to (i) reflect a light signal of a different spectral width based on received incident light, and (ii) change a characteristic of the reflected light signal based on strain experienced by the optical fiber.

In some embodiments, the operations further include: providing a second incident light signal to the third optical fiber, receiving reflected light signals of different spectral widths of the second incident light from one or more of the third plurality of sensors, processing the reflected light signals associated with the third set of one or more of core fibers to determine a second 3D shape extending between proximal and distal ends of the third optical fiber, determining a positioning and an orientation of the second 3D shape in the reference plane thereby determining an orientation of the second elongate member relative to the orientation of the ultrasound imaging probe and rendering an image of the second 3D shape within the image on the display of the medical system in accordance with the positioning and the orientation of the second 3D shape. In other embodiments, the operations further include receiving an ultrasound image from the ultrasound imaging probe, and causing rendering of the image of the second 3D shape on the display of the medical system to include a portion of a patient body based on the ultrasound image.

In other embodiments, the medical device is an intravascular device including a fourth optical fiber integrated therein that, the fourth optical fiber having a fourth plurality of sensors, wherein the fourth optical fiber is configured to receive the third incident light signal and provide fourth reflected light signals to the console, and wherein the operations further include determining the positioning and the orientation of the second 3D shape in the reference plane based at least in part on the fourth reflected light signals.

In some embodiments, the intravascular device includes one or more of a catheter, a stylet, a needle or a guidewire. In other embodiments, the first optical fiber includes a known shape that is utilized by the logic to determine the reference plane. In yet other embodiments, the operations further include causing rendering of a visual indication of a target blood vessel within the image. Further, wherein in use, an orientation of the ultrasound imaging probe may be manipulated to adjust an orientation of a viewing reference.

Additionally disclosed herein is a method of providing the system disclosed above.

These and other features of the concepts provided herein will become more apparent to those of skill in the art in view of the accompanying drawings and following description, which disclose particular embodiments of such concepts in greater detail.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
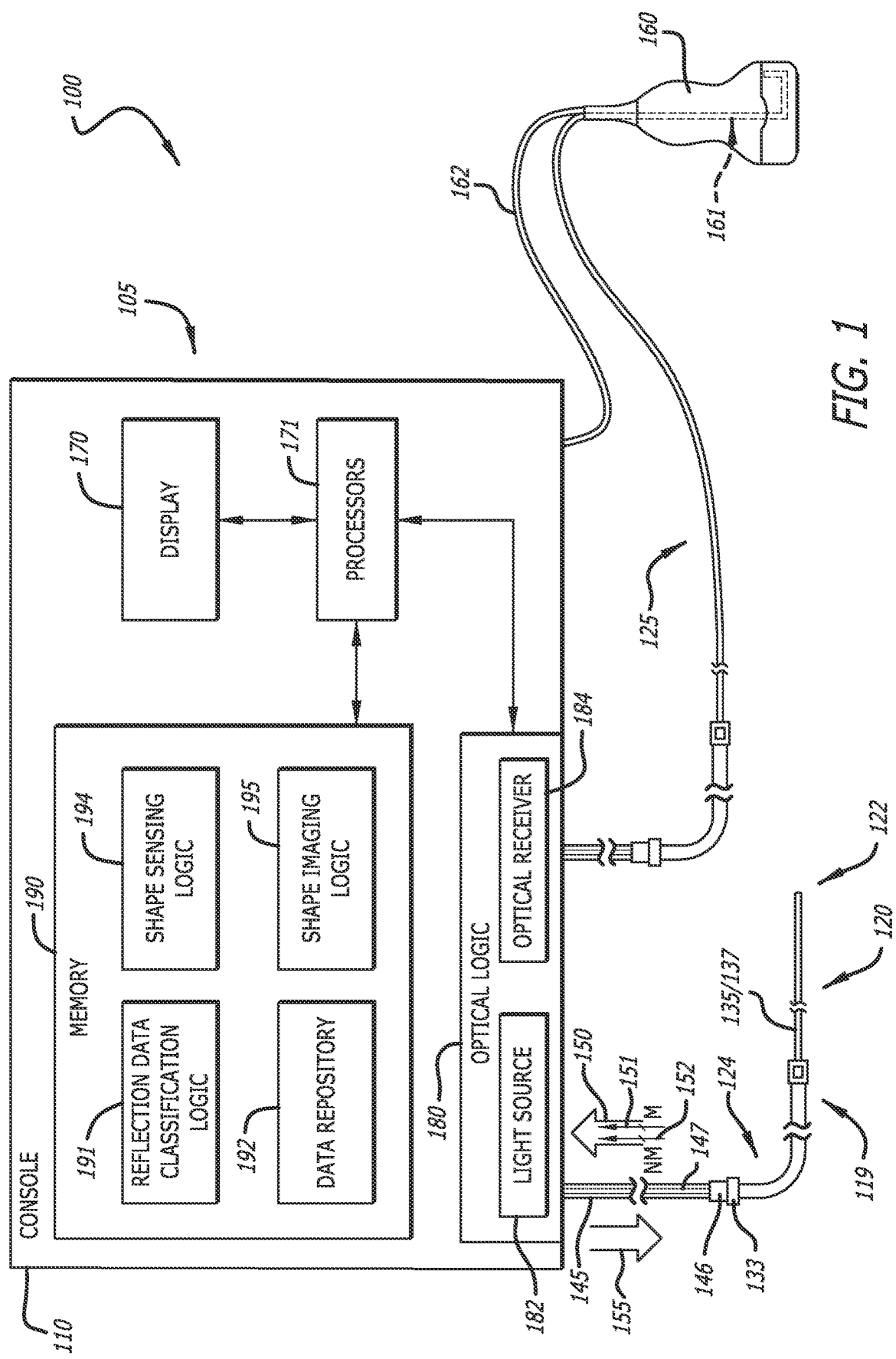
FIG. 1 is an illustrative embodiment of a medical instrument monitoring system including a medical instrument with optic shape sensing capabilities coupled with an ultrasound imaging probe, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The phrases "connected to," "coupled with," and "in communication with" refer to any form of interaction between two or more entities, including but not limited to mechanical, electrical, magnetic, electromagnetic, and optical interaction. Two components may be coupled to each other even though they are not in direct contact with each other. For example, two components may be coupled to each other through an intermediate component.

The terms "proximal" and "distal" refer to opposite ends of a medical device, including the devices disclosed herein. As used herein, the proximal portion of a medical device is the portion nearest a practitioner during use, while the distal portion is the portion at the opposite end. For example, the proximal end of an elongate probe guide is defined as the end closest to the clinician during utilization of the elongate probe. The distal end is the end opposite the proximal end, along the longitudinal direction of the elongate probe.

The term "logic" may be representative of hardware, firmware or software that is configured to perform one or more functions. As hardware, the term logic may refer to or include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the term logic may refer to or include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random-access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic may be stored in persistent storage.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

FIG. 1 illustrates an embodiment of a medical instrument placement system including a medical instrument. The medical instrument placement system (system) 100 is generally configured for mapping/tracking the trajectory or path of a medical device during insertion of the medical device within a patient. As shown, the system 100 generally includes a system module 105 having a console 110 operatively coupled with one or more medical instruments 119 and an ultrasound imaging probe 160 including an optical fiber 161 integrated therein (e.g., such as a single core optical fiber or one similar to the multi-core fiber 135 discussed herein). According to one embodiment, the medical instrument 119 includes an elongate probe 120 defining a distal end 122 and having a console connector 133 on a proximal end 124. The elongate probe 120 includes an optical fiber 135 extending along a length of the elongate probe 120 as further described below. The console connector 133 enables the elongate probe 120 to be operably connected to the console 110 via an interconnect 145 including one or more optical fibers 147 (hereinafter, "optical fiber(s)") terminated by a single optical connector 146 (or terminated by dual connectors). Herein, the connector 146 is configured to engage (mate) with the console connector 133 to allow for the propagation of light between the console 110 and the elongate probe 120.

The medical instrument 119 including the elongate probe 120 may be configured to perform any of a variety of medical procedures. As such, the elongate probe 120 may be a component of or employed with a variety of medical devices 119. In some implementations, the medical instrument 119 may take the form of a guidewire, a catheter, a stylet, or a needle, for example.

According to one embodiment, the console 110 includes one or more processors 171, a memory 190, a display 170, and optical logic 180, although it is appreciated that the console 110 can take one of a variety of forms and may include additional components (e.g., power supplies, ports, interfaces, etc.) that are not directed to aspects of the disclosure. An illustrative example of the console 110 is illustrated in U.S. Pat. No. 10,992,078, the entire contents of which are incorporated by reference herein. The one or more processors 171, with access to the memory 190 (e.g., non-volatile memory or non-transitory, computer-readable medium), are included to control functionality of the console 110 during operation. As shown, the display 170 may be a liquid crystal diode (LCD) display integrated into the console 110 and employed as a user interface to display information to the clinician, especially during an instrument placement procedure. In another embodiment, the display 170 may be separate from the console 110. Although not shown, a user interface is configured to provide user control of the console 110.

According to the illustrated embodiment, the content depicted by the display 170 may constitute a two-dimensional or three-dimensional representation of the physical state (e.g., length, shape, form, and/or orientation) of the elongate probe 120 computed from characteristics of reflected light signals 150 returned to the console 110. The reflected light signals 150 constitute light of a specific spectral width of broadband incident light 155 reflected back to the console 110. According to one embodiment of the disclosure, the reflected light signals 150 may pertain to various discrete portions (e.g., specific spectral widths) of broadband incident light 155 transmitted from and sourced by the optical logic 180, as described below.

Referring still to FIG. 1, the optical logic 180 is configured to support operability of the elongate probe 120 and enable the return of information to the console 110, which may be used to determine the physical state associated with the elongate probe 120. The physical state of the elongate probe 120 may be based on changes in characteristics of the reflected light signals 150 received at the console 110 from the elongate probe 120. The characteristics may include shifts in wavelength caused by strain on certain regions of the core fibers integrated within the optical fiber core 135 positioned within or operating as the elongate probe 120, as shown below. As discussed herein, the optical fiber core 135 may comprise core fibers $137_1$-$137_M$ (M=1 for a single core, and M>2 for a multi-core), where the core fibers $137_1$-$137_M$ may collectively be referred to as core fiber(s) 137. Unless otherwise specified or the instant embodiment requires an alternative interpretation, embodiments discussed herein will refer to a multi-core optical fiber 135. From information associated with the reflected light signals 150, the console 110 may determine (through computation or extrapolation of the wavelength shifts) the physical state of the elongate probe 120.

According to one embodiment of the disclosure, as shown in FIG. 1, the optical logic 180 may include a light source 182 and an optical receiver 184. The light source 182 is configured to transmit the incident light 155 (e.g., broadband) for propagation over the optical fiber(s) 147 included in the interconnect 145, which are optically connected to the multi-core optical fiber core 135 within the elongate probe 120. In one embodiment, the light source 182 is a tunable swept laser, although other suitable light sources can also be employed in addition to a laser, including semi-coherent light sources, LED light sources, etc.

The optical receiver 184 is configured to: (i) receive returned optical signals, namely reflected light signals 150 received from optical fiber-based reflective gratings (sensors) fabricated within each core fiber of the multi-core optical fiber 135 deployed within the elongate probe 120, and (ii) translate the reflected light signals 150 into reflection data (from a data repository 192), namely data in the form of electrical signals representative of the reflected light signals including wavelength shifts caused by strain. The reflected light signals 150 associated with different spectral widths may include reflected light signals 151 provided from sensors positioned in the center core fiber (reference) of the multi-core optical fiber 135 and reflected light signals 152 provided from sensors positioned in the periphery core fibers of the multi-core optical fiber 135, as described below. Herein, the optical receiver 184 may be implemented as a photodetector, such as a positive-intrinsic-negative "PIN" photodiode, avalanche photodiode, or the like.

As shown, both the light source 182 and the optical receiver 184 are operably connected to the one or more processors 171, which governs their operation. Also, the optical receiver 184 is operably coupled to provide the reflection data (from the data repository 192) to the memory 190 for storage and processing by reflection data classification logic 191. The reflection data classification logic 191 may be configured to: (i) identify which core fibers pertain to which of the received reflection data (from the data repository 192) and (ii) segregate the reflection data stored within the data repository 192 provided from reflected light signals 150 pertaining to similar regions of the elongate probe 120 or spectral widths into analysis groups. The reflection data for each analysis group is made available to shape sensing logic 194 for analytics.

According to one embodiment of the disclosure, the shape sensing logic 194 is configured to compare wavelength shifts measured by sensors deployed in each periphery core fiber at the same measurement region of the elongate probe 120 (or same spectral width) to the wavelength shift at a center core fiber of the multi-core optical fiber 135 positioned along central axis and operating as a neutral axis of bending. From these analytics, the shape sensing logic 194 may determine the shape the core fibers have taken in three-dimensional space and may further determine the current physical state of the elongate probe 120 in three-dimensional space for rendering on the display 170.

According to one embodiment of the disclosure, the shape sensing logic 194 may generate a rendering of the current physical state of the elongate probe 120, based on heuristics or run-time analytics. For example, the shape sensing logic 194 may be configured in accordance with machine-learning techniques to access the data repository 192 with pre-stored data (e.g., images, etc.) pertaining to different regions of the elongate probe 120 in which reflected light from core fibers have previously experienced similar or identical wavelength shifts. From the pre-stored data, the current physical state of the elongate probe 120 may be rendered. Alternatively, as another example, the shape sensing logic 194 may be configured to determine, during run-time, changes in the physical state of each region of the multi-core optical fiber 135 based on at least: (i) resultant wavelength shifts experienced by different core fibers within the optical fiber 135, and (ii) the relationship of these wavelength shifts generated by sensors positioned along different periphery core fibers at the same cross-sectional region of the multi-core optical fiber 135 to the wavelength shift generated by a sensor of the center core fiber at the same cross-sectional region. It is contemplated that other processes and procedures may be performed to utilize the wavelength shifts as measured by sensors along each of the core fibers within the multi-core optical fiber 135 to render appropriate changes in the physical state of the elongate probe 120, especially to enable guidance of the elongate probe 120 when positioned within the patient and at a desired destination within the body.

The system 100 further includes an elongate member 125 coupled between the console 110 and ultrasonic imaging probe 160. The elongate member 125 may in some respects resemble the elongate probe 120 including features and functionality as described above including coupling and interactions with the console 110, i.e., the elongate member 125 includes an optical fiber such as the multi-core optical fiber 135. Accordingly, the relevant descriptions of such features and functionality of the elongate probe 120 may apply equally to the features and functionality of the elongate member 125. Any suitable combination of the features, and variations of the same, described with respect to the elongate probe 120 can be employed with the elongate member 125.

The ultrasound imaging probe 160 is operatively connected to the console 110 via a cable 162 including electrical wires extending along the cable 162. The shape imaging logic 195 may receive and process data from the imaging probe 160 for rendering ultrasound images on the display 170. The elongate member 125 is coupled between the imaging probe 160 and console 110. In some embodiments, the cable 162 may a multimodal cable including the electrical wires and optical fibers. In some embodiments, the elongate member 125 may be incorporated into the cable 162.

The ultrasound imaging probe 160 may be configured to detect blood vessels within the patient and define a target blood vessel as taught by U.S. Publication No. 2021/0085282, titled "Automatic Vessel Detection Tools and Methods," and filed Sep. 14, 2020, which is incorporated herein by reference is its entirety.

In the illustrated embodiment, system 100 generally includes both the elongate probe 120 and the elongate member 125. In some embodiments, the elongate member 120 may be omitted from the system 100.

Figure 2:
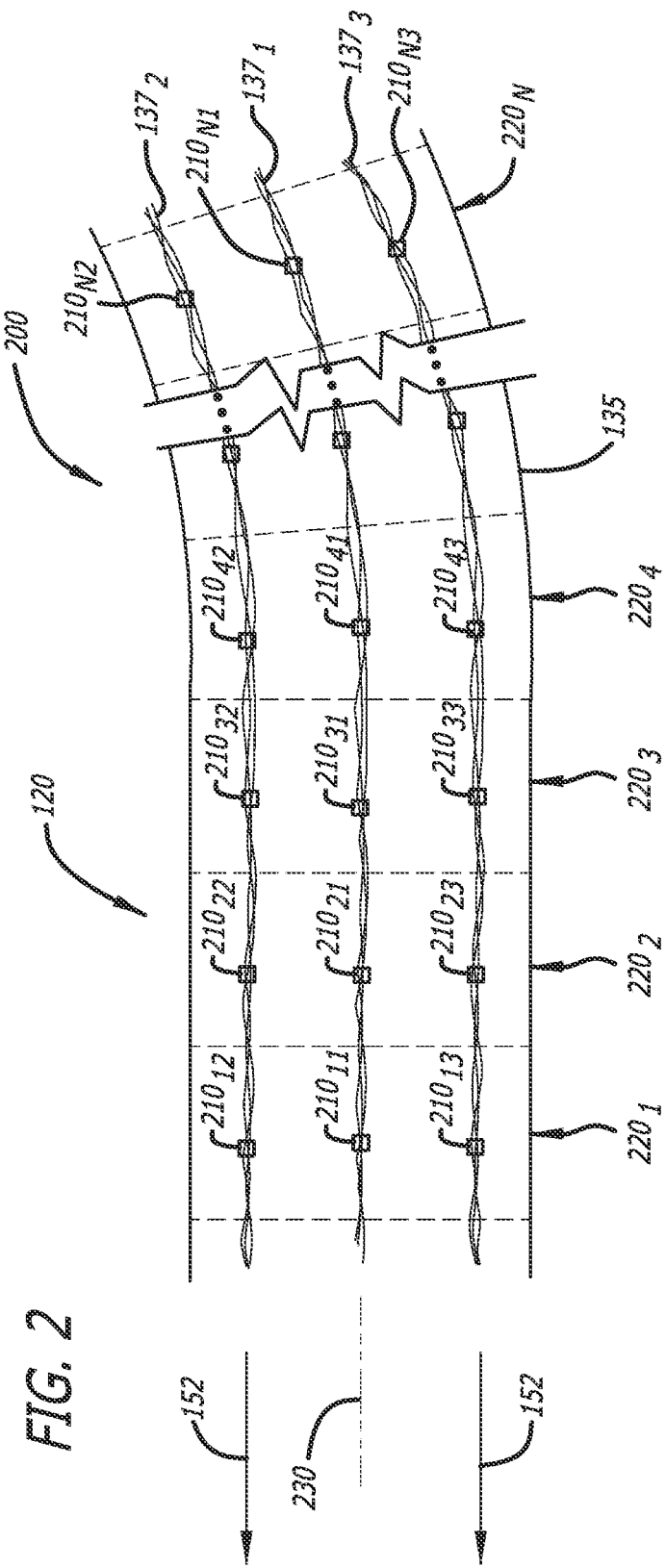
FIG. 2 is an exemplary embodiment of a structure of a section of the multi-core optical fiber included within the elongate probe of FIG. 1, in accordance with some embodiments.

Referring to FIG. 2, an exemplary embodiment of a structure of a section of the multi-core optical fiber included within the elongate probe 120 of FIG. 1 is shown in accordance with some embodiments. The multi-core optical fiber section 200 of the multi-core optical fiber 135 depicts certain core fibers $137_1$-$137_M$ (M≥2, M=4 as shown, see FIG. 3A) along with the spatial relationship between sensors (e.g., reflective gratings) $210_{11}$-$210_{NM}$ (N≥2; M≥2) present within the core fibers $137_1$-$137_M$, respectively. As noted above, the core fibers $137_1$-$137_M$ may be collectively referred to as "the core fibers 137."

As shown, the section 200 is subdivided into a plurality of cross-sectional regions $220_1$-$220_N$, where each cross-sectional region $220_1$-$220_N$ corresponds to reflective gratings $210_{11}$-$210_{14}$ . . . $210_{N1}$-$210_{N4}$. Some or all of the cross-sectional regions $220_1$ . . . $220_N$ may be static (e.g., prescribed length) or may be dynamic (e.g., vary in size among the regions $220_1$ . . . $220_N$). A first core fiber $137_1$ is positioned substantially along a center (neutral) axis 230 while core fiber $137_2$ may be oriented within the cladding of the multi-core optical fiber 135, from a cross-sectional, front-facing perspective, to be position on "top" the first core fiber $137_1$. In this deployment, the core fibers $137_3$ and $137_4$ may be positioned "bottom left" and "bottom right" of the first core fiber $137_1$. As examples, FIGS. 3A-4B provides illustrations of such.

Referencing the first core fiber $137_1$ as an illustrative example, when the elongate probe 120 is operative, each of the reflective gratings $210_1$-$210_N$ reflects light for a different spectral width. As shown, each of the gratings $210_{1i}$-$210_{Ni}$ (1≤i≤M) is associated with a different, specific spectral width, which would be represented by different center frequencies of $f_1$ . . . $f_N$, where neighboring spectral widths reflected by neighboring gratings are non-overlapping according to one embodiment of the disclosure.

Herein, positioned in different core fibers $137_2$-$137_3$ but along at the same cross-sectional regions $220$-$220_N$ of the multi-core optical fiber 135, the gratings $210_{12}$-$210_{N2}$ and $210_{13}$-$210_{N3}$ are configured to reflect incoming light at same (or substantially similar) center frequency. As a result, the reflected light returns information that allows for a determination of the physical state of the optical fibers 137 (and the elongate probe 120 and or the elongate member 125) based on wavelength shifts measured from the returned, reflected light. In particular, strain (e.g., compression or tension) applied to the multi-core optical fiber 135 (e.g., at least core fibers $137_2$-$137_3$) results in wavelength shifts associated with the returned, reflected light. Based on different locations, the core fibers $137_1$-$137_4$ experience different types and degree of strain based on angular path changes as the elongate probe 120 advances in the patient.

For example, with respect to the multi-core optical fiber section 200 of FIG. 2, in response to angular (e.g., radial) movement of the elongate probe 120 is in the left-veering direction, the fourth core fiber $137_4$ (see FIG. 3A) of the multi-core optical fiber 135 with the shortest radius during movement (e.g., core fiber closest to a direction of angular change) would exhibit compression (e.g., forces to shorten length). At the same time, the third core fiber $137_3$ with the longest radius during movement (e.g., core fiber furthest from the direction of angular change) would exhibit tension (e.g., forces to increase length). As these forces are different and unequal, the reflected light from reflective gratings $210_{N2}$ and $210_{N3}$ associated with the core fiber $137_2$ and $137_3$ will exhibit different changes in wavelength. The differences in wavelength shift of the reflected light signals 150 can be used to extrapolate the physical configuration of the elongate probe 120 by determining the degrees of wavelength change caused by compression/tension for each of the periphery fibers (e.g., the second core fiber $137_2$ and the third core fiber $137_3$) in comparison to the wavelength of the reference core fiber (e.g., first core fiber $137_1$) located along the neutral axis 230 of the multi-core optical fiber 135. These degrees of wavelength change may be used to extrapolate the physical state of the elongate probe 120. The reflected light signals 150 are reflected back to the console 110 via individual paths over a particular core fiber $137_1$-$137_M$.

Figure 3B:
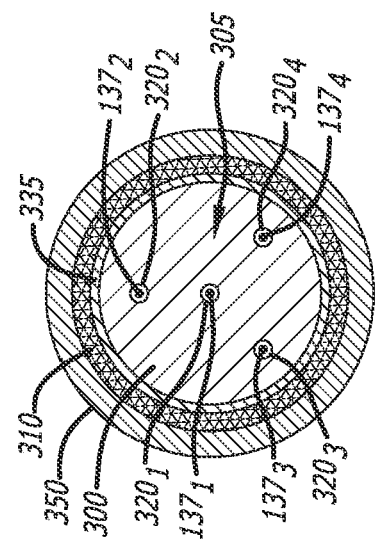
FIG. 3B is a cross-sectional view of the elongate probe of FIG. 3A, in accordance with some embodiments.
Figure 3A:
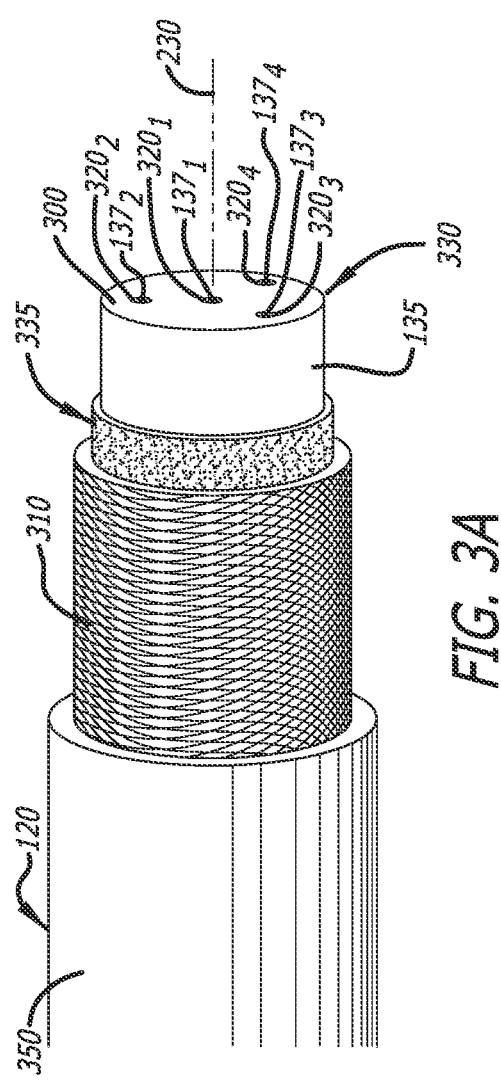
FIG. 3A is a first exemplary embodiment of the elongate probe of FIG. 1 supporting optical signaling, in accordance with some embodiments.

Referring to FIG. 3A, a first exemplary embodiment of the elongate probe of FIG. 1 supporting optical signaling is shown in accordance with some embodiments. Herein, the elongate probe 120 features a centrally located multi-core optical fiber 135, which includes a cladding 300 and a plurality of core fibers $137_1$-$137_M$ (M≥2; M=4) residing within a corresponding plurality of lumens $320_1$-$320_M$. While the multi-core optical fiber 135 is illustrated within four (4) core fibers $137_1$-$137_4$, a greater number of core fibers $137_1$-$137_M$ (M>4) may be deployed to provide a more detailed three-dimensional sensing of the physical state (e.g., shape, etc.) of the multi-core optical fiber 135 and the elongate probe 120 deploying the optical fiber 135.

For this embodiment of the disclosure, the multi-core optical fiber 135 is encapsulated within a concentric braided tubing 310 positioned over a low coefficient of friction layer 335. The braided tubing 310 may feature a "mesh" construction, in which the spacing between the intersecting conductive elements is selected based on the degree of rigidity desired for the elongate probe 120, as a greater spacing may provide a lesser rigidity, and thereby, a more pliable elongate probe 120.

According to this embodiment of the disclosure, as shown in FIGS. 3A-3B, the core fibers $137_1$-$137_4$ include (i) a central core fiber $137_1$ and (ii) a plurality of periphery core fibers $137_2$-$137_4$, which are maintained within lumens $320_1$-$320_4$ formed in the cladding 300. According to one embodiment of the disclosure, one or more of the lumens $320_1$-$320_4$ may be configured with a diameter sized to be greater than the diameter of the core fibers $137_1$-$137_4$. By avoiding a majority of the surface area of the core fibers $137_1$-$137_4$ from being in direct physical contact with a wall surface of the lumens $320_1$-$320_4$, the wavelength changes to the incident light are caused by angular deviations in the multi-core optical fiber 135 thereby reducing influence of compression and tension forces being applied to the walls of the lumens $320_1$-$320_M$, not the core fibers $137_1$-$137_M$ themselves.

As further shown in FIGS. 3A-3B, the core fibers $137_1$-$137_4$ may include central core fiber $137_1$ residing within a first lumen $320_1$ formed along the first neutral axis 230 and a plurality of core fibers $137_2$-$137_4$ residing within lumens $320_2$-$320_4$ each formed within different areas of the cladding 300 radiating from the first neutral axis 230. In general, the core fibers $137_2$-$137_4$, exclusive of the central core fiber $137_1$, may be positioned at different areas within a cross-sectional area 305 of the cladding 300 to provide sufficient separation to enable three-dimensional sensing of the multi-core optical fiber 135 based on changes in wavelength of incident light propagating through the core fibers $137_2$-$137_4$ and reflected back to the console for analysis.

For example, where the cladding 300 features a circular cross-sectional area 305 as shown in FIG. 3B, the core fibers $137_2$-$137_4$ may be positioned substantially equidistant from each other as measured along a perimeter of the cladding 300, such as at "top" (12 o'clock), "bottom-left" (8 o'clock) and "bottom-right" (4 o'clock) locations as shown. Hence, in general terms, the core fibers $137_2$-$137_4$ may be positioned within different segments of the cross-sectional area 305. Where the cross-sectional area 305 of the cladding 300 has a distal tip 330 and features a polygon cross-sectional shape (e.g., triangular, square, rectangular, pentagon, hexagon, octagon, etc.), the central core fiber $137_1$ may be located at or near a center of the polygon shape, while the remaining core fibers $137_2$-$137_M$ may be located proximate to angles between intersecting sides of the polygon shape.

Referring still to FIGS. 3A-3B, the braided tubing 310 provides mechanical integrity to the multi-core optical fiber 135. For example, the braided tubing 310 may be exposed to a distal tip of the elongate probe 120. The cladding 300 and the braided tubing 310, which is positioned concentrically surrounding a circumference of the cladding 300, are contained within an outer layer 350. The outer layer 350 may be a sheath or conduit made of protective material that encapsulates both for the cladding 300 and the braided tubing 310, as shown.

The shape of the optical fiber 135 in three-dimensional space may be translated into a 3D shape of the elongate probe 120. As the dimensions of the elongate probe 120 (e.g., diameter and length) along a measured region may be known, the spatial relationship of defined segments along the measured region may be calculated according to established engineering mathematical formulas that relate strain to a radius of curvature. In other words, the position in 3D space of a first point located along the measured region with respect to a second point located along the measured region may be calculated. Similarly, the 3D direction of a first unit vector defining the direction of the elongate member 120 at the first point with respect to the direction of a second unit vector defining the direction of the elongate probe 120 at the second point may be calculated. By way of summary, the position and direction of the elongate member 120 at any point with respect to the position and direction of the elongate member 120 at any other point may be calculated.

Figure 4A:
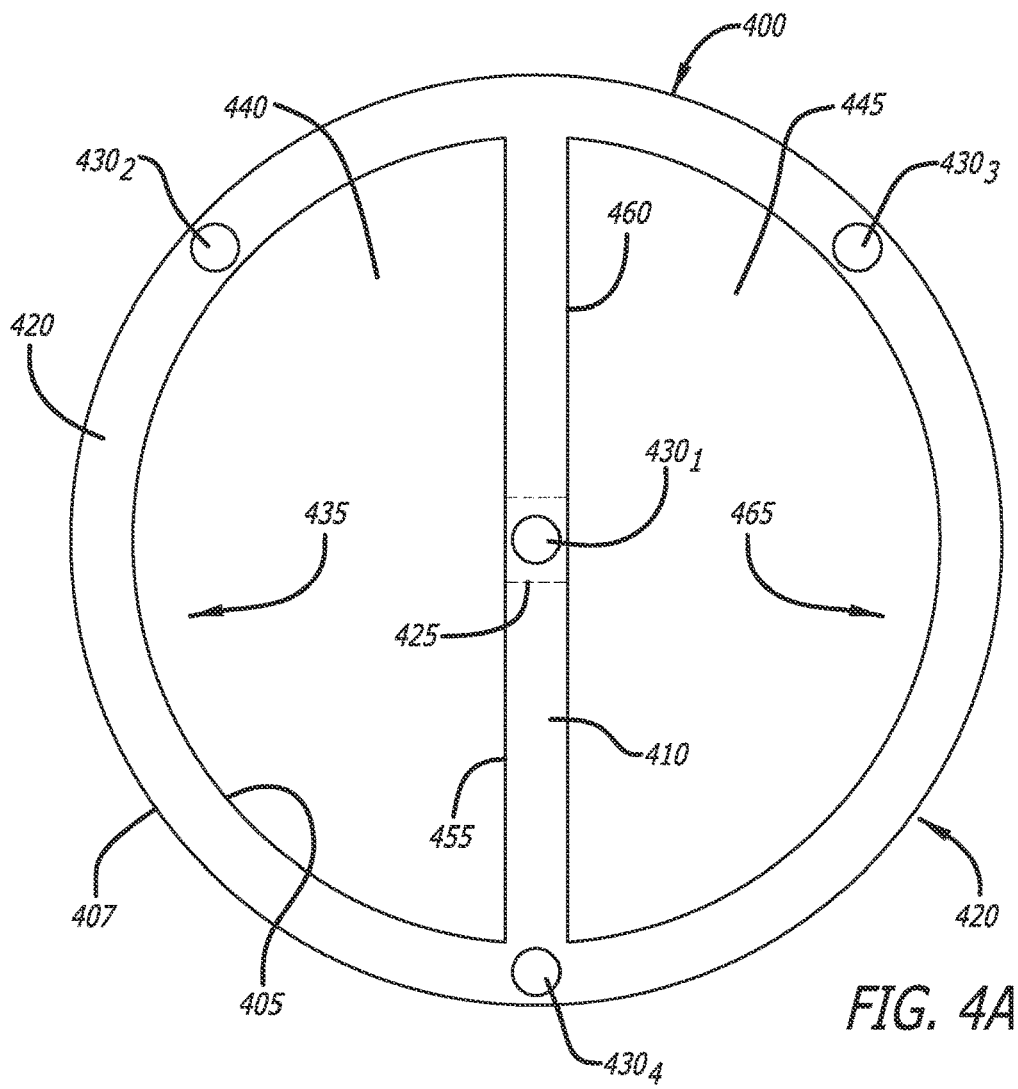
FIG. 4A is an elevation view of a first illustrative embodiment of a catheter including integrated tubing, a diametrically disposed septum, and micro-lumens formed within the tubing and septum, in accordance with some embodiments.

Referring to FIG. 4A, an elevation view of a first illustrative embodiment of an elongate probe in the form of a catheter including integrated tubing, a diametrically disposed septum, and micro-lumens formed within the tubing and septum is shown in accordance with some embodiments. Herein, the catheter 400 includes integrated tubing, the diametrically disposed septum 410, and the plurality of micro-lumens $430_1$-$430_4$ which, for this embodiment, are fabricated to reside within the wall 420 of the integrated tubing of the catheter 400 and within the septum 410. In particular, the septum 410 separates a single lumen, formed by the inner surface 405 of the wall 420 of the catheter 400, into multiple lumens, namely two lumens 440 and 445 as shown. Herein, the first lumen 440 is formed between a first arc-shaped portion 435 of the inner surface 405 of the wall 420 forming the catheter 400 and a first outer surface 455 of the septum 410 extending longitudinally within the catheter 400. The second lumen 445 is formed between a second arc-shaped portion 465 of the inner surface 405 of the wall 420 forming the catheter 400 and a second outer surfaces 460 of the septum 410.

According to one embodiment of the disclosure, the two lumens 440 and 445 have approximately the same volume. However, the septum 410 need not separate the tubing into two equal lumens. For example, instead of the septum 410 extending vertically (12 o'clock to 6 o'clock) from a front-facing, cross-sectional perspective of the tubing, the septum 410 could extend horizontally (3 o'clock to 9 o'clock), diagonally (1 o'clock to 7 o'clock; 10 o'clock to 4 o'clock) or angularly (2 o'clock to 10 o'clock). In the later configuration, each of the lumens 440 and 445 of the catheter 400 would have a different volume.

With respect to the plurality of micro-lumens $430_1$-$430_4$, the first micro-lumen $430_1$ is fabricated within the septum 410 at or near the cross-sectional center 425 of the integrated tubing. For this embodiment, three micro-lumens $430_2$-$430_4$ are fabricated to reside within the wall 420 of the catheter 400. In particular, a second micro-lumen $430_2$ is fabricated within the wall 420 of the catheter 400, namely between the inner surface 405 and outer surface 407 of the first arc-shaped portion 435 of the wall 420. Similarly, the third micro-lumen $430_3$ is also fabricated within the wall 420 of the catheter 400, namely between the inner and outer surfaces 405/407 of the second arc-shaped portion 455 of the wall 420. The fourth micro-lumen $430_4$ is also fabricated within the inner and outer surfaces 405/407 of the wall 420 that are aligned with the septum 410.

According to one embodiment of the disclosure, as shown in FIG. 4A, the micro-lumens $430_2$-$430_4$ are positioned in accordance with a "top-left" (10 o'clock), "top-right" (2 o'clock) and "bottom" (6 o'clock) layout from a front-facing, cross-sectional perspective. Of course, the micro-lumens $430_2$-$430_4$ may be positioned differently, provided that the micro-lumens $430_2$-$430_4$ are spatially separated along the circumference 420 of the catheter 400 to ensure a more robust collection of reflected light signals from the outer core fibers $470_2$-$470_4$ when installed. For example, two or more of micro-lumens (e.g., micro-lumens $430_2$ and $430_4$) may be positioned at different quadrants along the circumference 420 of the catheter wall 420.

Figure 4B:
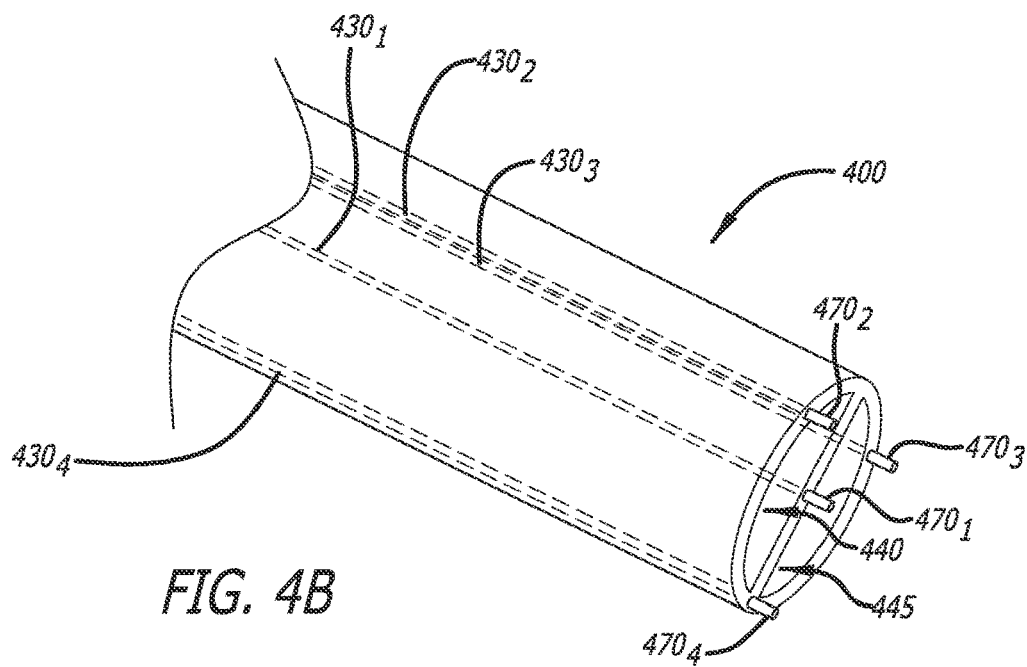
FIG. 4B is a perspective view of the first illustrative embodiment of the catheter of FIG. 4A including core fibers installed within the micro-lumens, in accordance with some embodiments.

Referring to FIG. 4B, a perspective view of the first illustrative embodiment of the catheter of FIG. 4A including core fibers installed within the micro-lumens is shown in accordance with some embodiments. According to one embodiment of the disclosure, the second plurality of micro-lumens $430_2$-$430_4$ are sized to retain corresponding outer core fibers $470_2$-$470_4$, where the diameter of each of the second plurality of micro-lumens $430_2$-$430_4$ may be sized just larger than the diameters of the outer core fibers $470_2$-$470_4$. The size differences between a diameter of a single core fiber and a diameter of any of the micro-lumen $430_1$-$430_4$ may range between 0.001 micrometers (μm) and 1000 μm, for example. As a result, the cross-sectional areas of the outer core fibers $470_2$-$470_4$ would be less than the cross-sectional areas of the corresponding micro-lumens $430_2$-$430_4$. A "larger" micro-lumen (e.g., micro-lumen $430_2$) may better isolate external strain being applied to the outer core fiber $470_2$ from strain directly applied to the catheter 400 itself. Similarly, the first micro-lumen $430_1$ may be sized to retain the center core fiber $470_1$, where the diameter of the first micro-lumen $430_1$ may be sized just larger than the diameter of the center core fiber $470_1$.

As an alternative embodiment of the disclosure, one or more of the micro-lumens $430_1$-$430_4$ may be sized with a diameter that exceeds the diameter of the corresponding one or more core fibers $470_1$-$470_4$. However, at least one of the micro-lumens $430_1$-$430_4$ is sized to fixedly retain their corresponding core fiber (e.g., core fiber retained with no spacing between its lateral surface and the interior wall surface of its corresponding micro-lumen). As yet another alternative embodiment of the disclosure, all the micro-lumens $430_1$-$430_4$ are sized with a diameter to fixedly retain the core fibers $470_1$-$470_4$.

During advancement through a patient vasculature, the catheter tubing of the catheter 400 receives broadband incident light 155 from the console 110 via optical fiber(s) 147 within the interconnect 145, where the incident light 155 propagates along the core fibers 137 of the multi-core optical fiber 135 within the catheter tubing of the catheter 400. According to one embodiment of the disclosure, the connector 146 of the interconnect 145 terminating the optical fiber(s) 147 may be coupled to the optical-based catheter connector 144, which may be configured to terminate the core fibers 137 deployed within the catheter 400. Such coupling optically connects the core fibers 137 of the catheter 500 with the optical fiber(s) 147 within the interconnect 145. The optical connectivity is needed to propagate the incident light 155 to the core fibers 137 and return the reflected light signals 150 to the optical logic 180 within the console 110 over the interconnect 145. As described below in detail, the physical state of the catheter 500 may be ascertained based on analytics of the wavelength shifts of the reflected light signals 150.

Figure 5A:
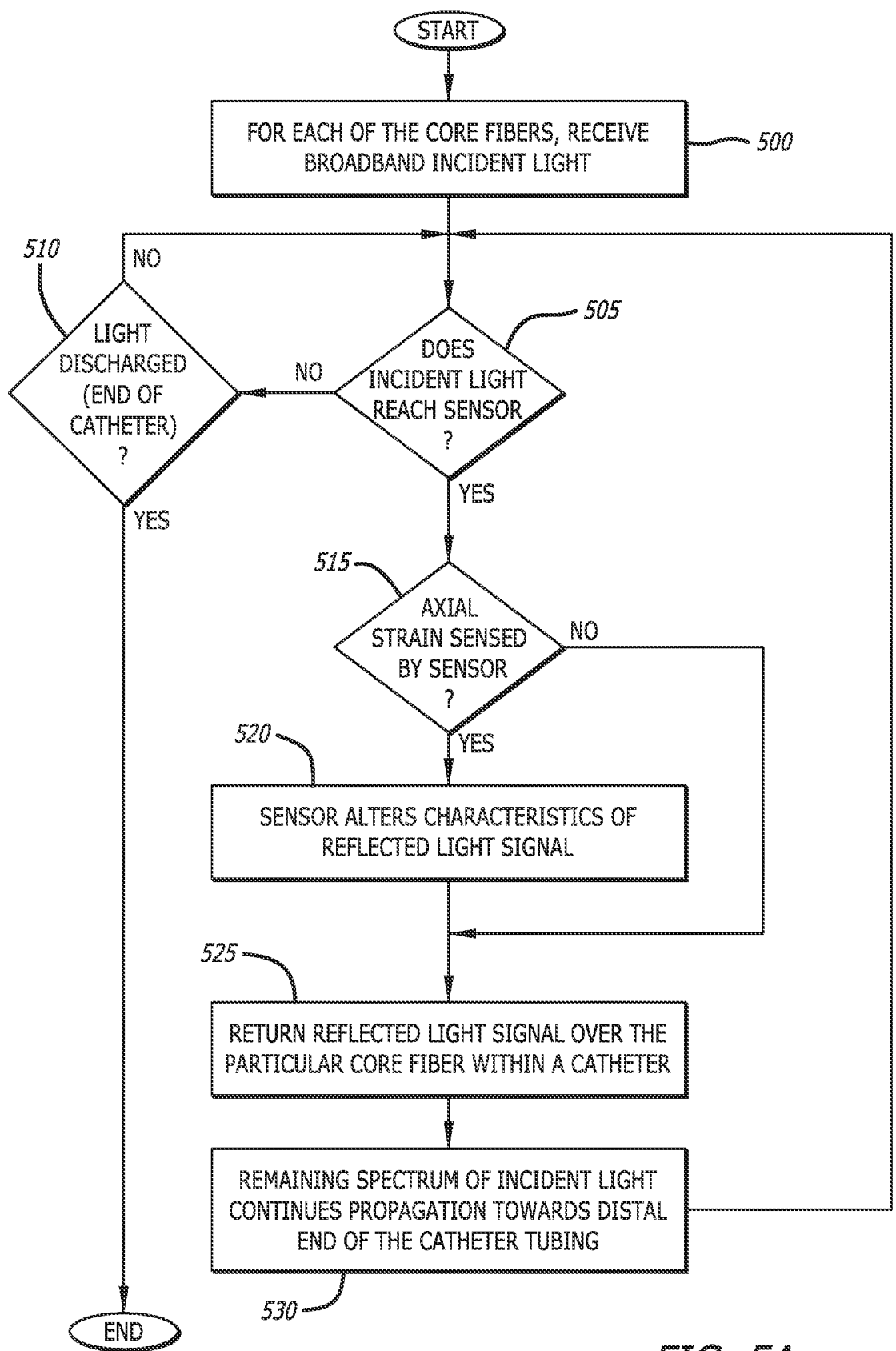
FIGS. 5A-5B are flowcharts of the methods of operations conducted by the medical instrument monitoring system of FIG. 1 to achieve optic 3D shape sensing, in accordance with some embodiments.
Figure 5B:
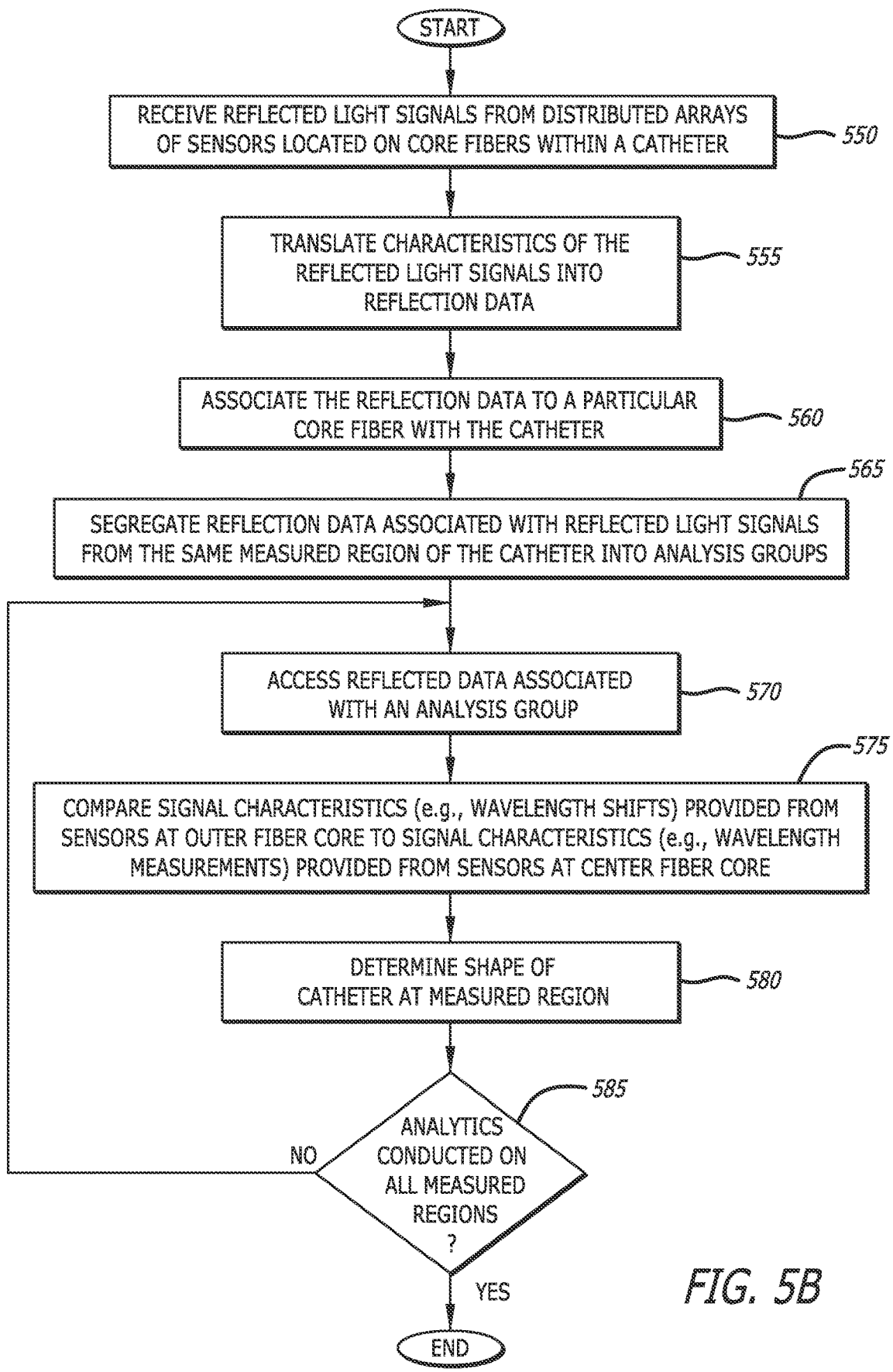

Referring to FIGS. 5A-5B, flowcharts of methods of operations conducted by the medical instrument monitoring system of FIG. 1 to achieve optic 3D shape sensing are shown in accordance with some embodiments. Herein, the catheter includes at least one septum spanning across a diameter of the tubing wall and continuing longitudinally to subdivide the tubing wall. The medial portion of the septum is fabricated with a first micro-lumen, where the first micro-lumen is coaxial with the central axis of the catheter tubing. The first micro-lumen is configured to retain a center core fiber. Two or more micro-lumen, other than the first micro-lumen, are positioned at different locations circumferentially spaced along the wall of the catheter tubing. For example, two or more of the second plurality of micro-lumens may be positioned at different quadrants along the circumference of the catheter wall.

Furthermore, each core fiber includes a plurality of sensors spatially distributed along its length between at least the proximal and distal ends of the catheter tubing. This array of sensors is distributed to position sensors at different regions of the core fiber to enable distributed measurements of strain throughout the entire length or a selected portion of the catheter tubing. These distributed measurements may be conveyed through reflected light of different spectral widths (e.g., specific wavelength or specific wavelength ranges) that undergoes certain wavelength shifts based on the type and degree of strain.

According to one embodiment of the disclosure, as shown in FIG. 5A, for each core fiber, broadband incident light is supplied to propagate through a particular core fiber (block 500). Unless discharged, upon the incident light reaching a sensor of a distributed array of sensors measuring strain on a particular core fiber, light of a prescribed spectral width associated with the first sensor is to be reflected back to an optical receiver within a console (blocks 505-510). Herein, the sensor alters characteristics of the reflected light signal to identify the type and degree of strain on the particular core fiber as measured by the first sensor (blocks 515-520). According to one embodiment of the disclosure, the alteration in characteristics of the reflected light signal may signify a change (shift) in the wavelength of the reflected light signal from the wavelength of the incident light signal associated with the prescribed spectral width. The sensor returns the reflected light signal over the core fiber and the remaining spectrum of the incident light continues propagation through the core fiber toward a distal end of the catheter tubing (blocks 525-530). The remaining spectrum of the incident light may encounter other sensors of the distributed array of sensors, where each of these sensors would operate as set forth in blocks 505-530 until the last sensor of the distributed array of sensors returns the reflected light signal associated with its assigned spectral width and the remaining spectrum is discharged as illumination.

Referring now to FIG. 5B, during operation, multiple reflected light signals are returned to the console from each of the plurality of core fibers residing within the corresponding plurality of micro-lumens formed within a catheter, such as the catheter of FIGS. 4A-4B. In particular, the optical receiver receives reflected light signals from the distributed arrays of sensors located on the center core fiber and the outer core fibers and translates the reflected light signals into reflection data, namely electrical signals representative of the reflected light signals including wavelength shifts caused by strain (blocks 550-555). The reflection data classification logic is configured to identify which core fibers pertain to which reflection data and segregate reflection data provided from reflected light signals pertaining to a particular measurement region (or similar spectral width) into analysis groups (block 560-565).

Each analysis group of reflection data is provided to shape sensing logic for analytics (block 570). Herein, the shape sensing logic compares wavelength shifts at each outer core fiber with the wavelength shift at the center core fiber positioned along central axis and operating as a neutral axis of bending (block 575). From these analytics, on all analytic groups (e.g., reflected light signals from sensors in all or most of the core fibers), the shape sensing logic may determine the shape the core fibers have taken in three-dimensional space, from which the shape sensing logic can determine the current physical state of the catheter in three-dimension space (blocks 580-585).

Figure 6A:
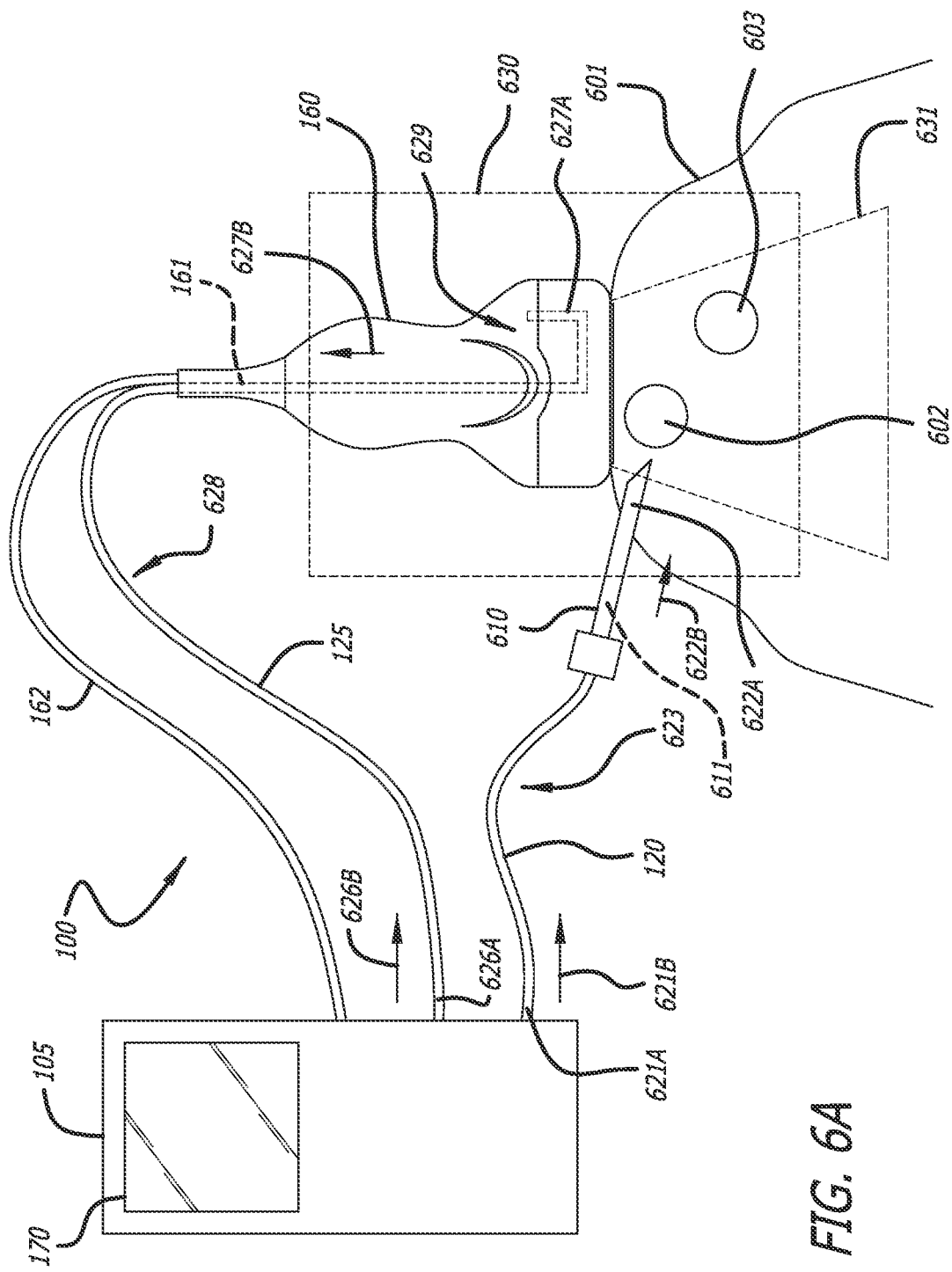
FIG. 6A illustrates an exemplary embodiment of the medical instrument monitoring system of FIG. 1 during ultrasound imaging and insertion of a needle into a patient, in accordance with some embodiments.

FIG. 6A illustrates a first implementation of the system 100 depicting an instance where a needle is being inserted into a vein of a patient, in accordance with some embodiments. Shown in FIG. 6A are the system module 105 connected to the ultrasound imaging probe 160 via the cable 162. The elongate member 125 is coupled between the system module 105 and the ultrasound imaging probe 160. The elongate member 125 may also be coupled with the cable 162 along a length of the cable 162. The elongate probe 120 is also coupled with the system module 105.

The elongate member 125 is physically attached (e.g., optically connected) to the system module 105 at a proximal end point 626A so that the elongate member 125 extends away from the system module 105 in a direction indicated by the unit vector 626B and where optical data (e.g., incident light and reflected light signals) are transmitted between the two components. The elongate member 125 is attached to (e.g., optically connected) to the ultrasound imaging probe 160 at a distal end point 627A so that the elongate member 125 extends away from the ultrasound imaging probe 160 in a direction indicated by the unit vector 627B. The shape sensing logic 194 determines a 3D shape 628 of the elongate member 125 and as such, the proximal and distal end points 626A, 627A of the elongate member 125 also represent the proximal and distal end points of the 3D shape 628. Similarly, the unit vectors 626B, 627B represent the direction of the 3D shape 628 at the proximal and distal end points of the 3D shape 628.

In some embodiments, the elongate probe 120 is physically attached (e.g., optically connected) to the system module 105 at a proximal end point 621A so that the elongate probe 120 extends away from the system module 105 in a direction indicated by the unit vector 621B. The elongate probe 120 extends toward the patient. Although not required, in some embodiments, the needle 610 may have an optical fiber 611 integrated therein. In such an embodiment, the needle 610, and specifically the optical fiber 611, is optically connected to the elongate probe 120 such that the optical fiber 611 and the elongate probe 120 exchange optical data therebetween. The needle 610 is inserted into the patient's arm 601 so that a distal end point 622A of the elongate probe 120 is positioned adjacent a vein 602 within the patient's arm 601. The direction of the needle 610 (and by association the distal end of the elongate probe 120) is indicated by the unit vector 622B. The shape sensing logic 194 determines a 3D shape 623 of the elongate probe 120, and as such, the proximal and distal end points 621A, 622A of the elongate probe 120 also represent the proximal and distal end points of the 3D shape 623. Similarly, the unit vectors 621B, 622B represent the direction of the 3D shape 623 at the proximal and distal end points of the 3D shape 623.

As the elongate member 125 and the elongate probe 120 are each physically attached to the system module 105, the locations of the proximal end points 626A, 621A and the unit vectors 626B and 621B are defined with respect to each other. As such, the proximal end of the 3D shape 628 of the elongate member 125 is spatially fixed both in position and direction with respect to the proximal end of the 3D shape 623 of the elongate probe 120.

With the proximal ends of the 3D shapes 623 and 628 spatially fixed with respect to each other, the shape sensing logic 194 may effectively couple the 3D shapes 623, 628 together. As such, the shape imaging logic 195 may determine (e.g., determine from known dimensions of the elongate member 125 and the elongate probe 120 as well as from reflected light signals from the elongate member 125, the optical fiber 161, the elongate probe 120 and the optical fiber 611, when applicable) the position of the distal end point 622A with respect to the position of the distal end point 627A from the 3D shapes 623, 628. Similarly, the shape imaging logic 195 may determine the direction of the unit vector 622B with respect to the direction of the unit vector 627B from the 3D shapes 623, 628. As the structural dimensions of the ultrasound imaging probe 160 may be known, such as a distance between the optical fiber 161 and the ultrasounds transducers (not shown) of the ultrasound imaging probe 160, the shape imaging logic 195 may further determine a position of the tip of the needle 610 (i.e., the distal end point 622A) with respect to the vein 602.

The optical fiber 161 includes a known shape 629 (e.g., one or more known curvatures), positioned within the ultrasound imaging probe 160 so that the optical fiber 161 serves as a static reference shape. Based on reflected light received from the optical fiber 161 via the elongate member 125, the shape imaging logic 195 may define a reference plane 630 in accordance with the known shape 629 of the optical fiber 161 via known geometric techniques (e.g., a plurality (three or more) points along the optical fiber 161). In some embodiments, the reference plane 630 may be aligned with (e.g., in parallel with) the ultrasound imaging probe 160 (e.g., a front side or a back side of the ultrasound imaging probe 160). For example, the reference plane 630 may a three-dimensional plane that is established with the ultrasound imaging probe 160 positioned at known coordinate points having a known orientation within the reference plane 630.

In some embodiments, the reference plane 630 may be aligned with the image plane 631 of the ultrasound imaging probe 160 (i.e., the viewing reference plane for the ultrasound image). For example, as illustrated in FIG. 6A, the ultrasound imaging probe 160 is positioned on the patient's arm 601 to define a cross-sectional view of the arm 601, i.e., the image plane 631 is oriented perpendicular to the arm 601. The reference plane 630 may define a reference frame for generating an image of the 3D shape 623. In other words, the shape imaging logic 195 may define a viewing reference point of 3D shape 623 in accordance with (e.g., perpendicular with) the reference plane 630.

Figure 6B:
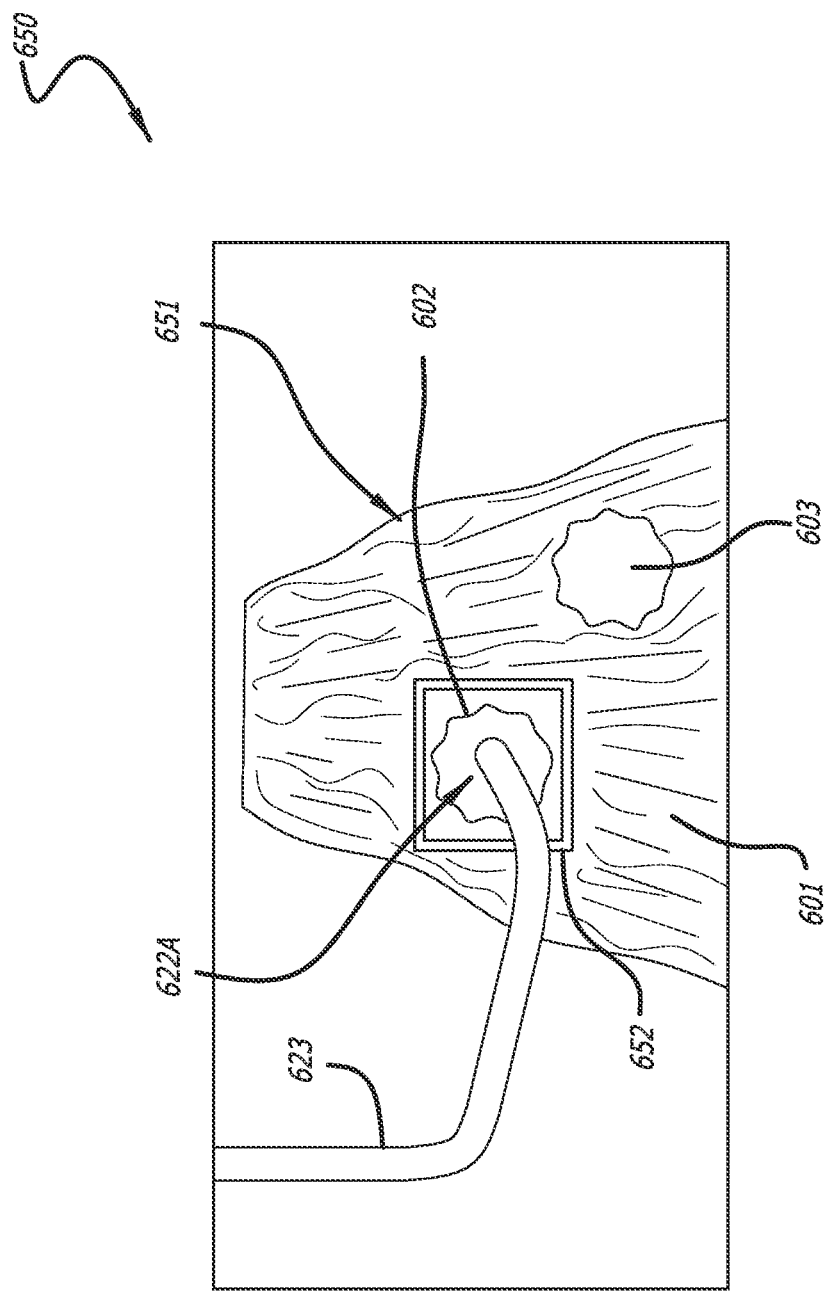
FIG. 6B is exemplary screen shot as may be rendered on a display of the system of FIG. 1 showing an ultrasound image in combination with an image of 3D shape of the elongate probe, in accordance with some embodiments.

FIG. 6B illustrates an exemplary screen shot as may be rendered on the display, in accordance with some embodiments. The image 650 includes an ultrasound image 651 of the patient's arm 601. The image plane of the ultrasound imaging probe 160 is oriented perpendicular to the arm 601 to define a cross-sectional end view of a portion of arm 601 including cross-sectional views of the vein 602 and the artery 603. The image 650 further includes an image of a portion of the 3D shape 623 of the elongate probe 120 and a distal point 622A of the 3D shape 623 is shown within the cross-sectional ultrasound image of the vein 602.

In some embodiments, the ultrasound imaging probe 160 may identify one or more blood vessels within the ultrasound image 651, such as the vein 602 and the artery 603, for example. The ultrasound imaging probe 160 may further differentiate the vein 602 from the artery 603, and provide a visual target indication 652 of the vein 602 in the ultrasound image 651. In some embodiments, display logic of the console 105 may render the vein 602 in a visually-distinct manner as the artery 603 (e.g., render in different colors, provide an outline around either the vein 602 or the artery 603, provide visually-distinct outlines around each of the vein 602 and the artery 603, etc.).

Figure 6C:
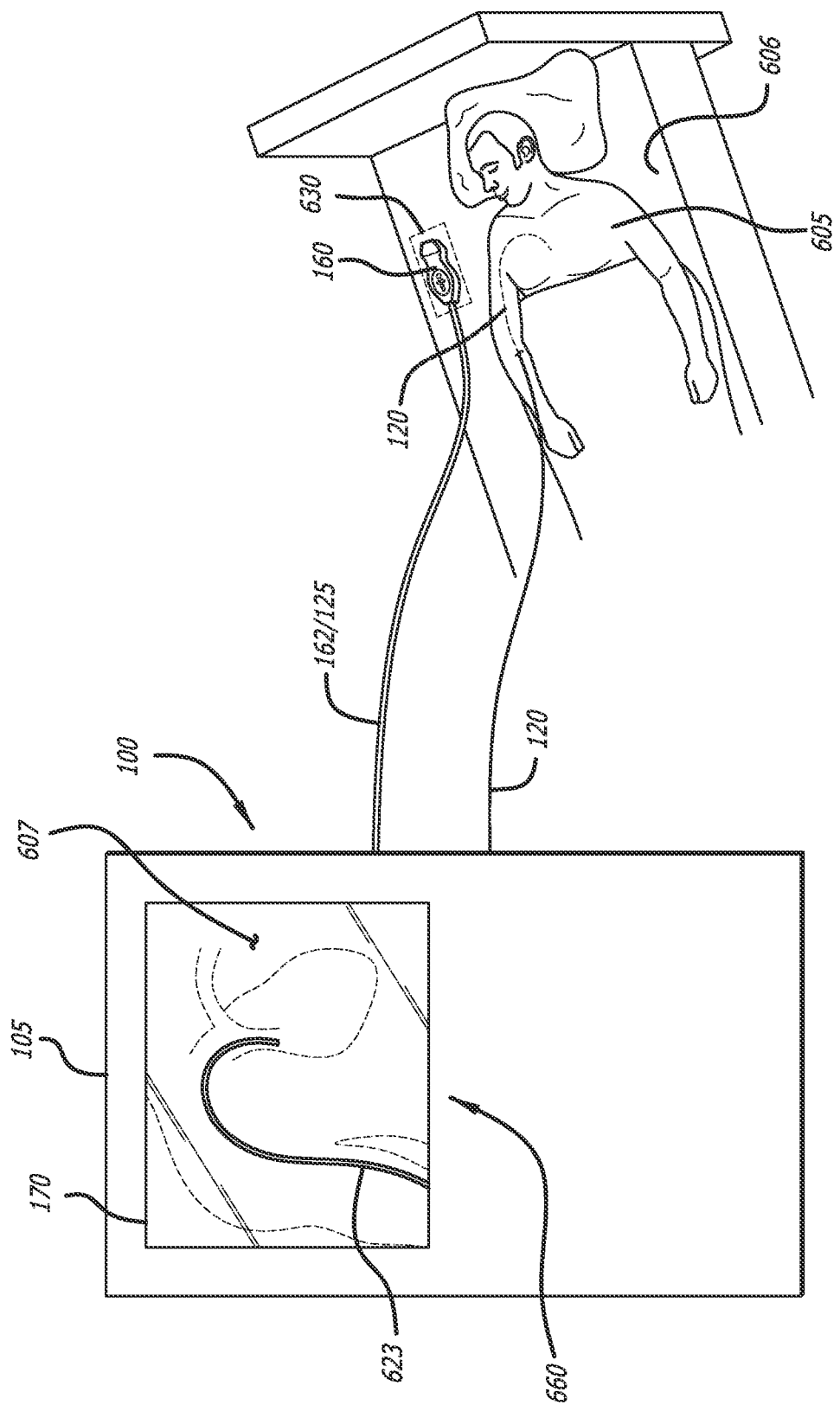
FIG. 6C illustrates an exemplary use case of the system of FIG. 1, in accordance with some embodiments.

FIG. 6C illustrates an exemplary use case of the medical instrument placement system of FIG. 1, in accordance with some embodiments. Shown is a patient 605 lying face-up on a bed 606. The elongate probe 120 is in the form of a peripherally inserted central catheter (PICC) inserted into a vein of an arm of the patient 605. The elongate probe 120 extends along the vasculature of the patient 605 to the superior vena cava (not shown). The elongate probe 120 is coupled with the system module 105 to enable shape sensing of the elongate probe 120.

The ultrasound imaging probe 160 is coupled with the system module 105 via the cable 162 and elongate member 125 extends along the cable 162. In FIG. 6C, the cable 162 and the elongate member 125 are shown as single component. In some embodiments, the elongate member 125 may be combined with electrical wires of the cable 162 within a covering/sheath do define a single cable extending between the system module 105 and the ultrasound imaging probe 160.

The ultrasound imaging probe 160 is placed face-up on the bed so that the ultrasound imaging probe 160 is in parallel with the bed surface. As such, the reference plane 630 is in parallel with the bed surface along with the patient 605. In other words, the reference plane 630 is in parallel with the patient 605. As discussed above, the reference plane 630 defines a viewing reference for the image of the 3D shape 623 of the elongate probe 120.

An image 660 of the 3D shape 623 is rendered on the display 170 of the system module 105. As the reference plane 630 is in parallel with the patient 605, the image 660 shows the 3D shape 623 oriented to be consistent with a front view of the patient 605. In some embodiments, the image 660 may include a representation 607 of the patient to provide indication of the orientation of the reference plane 630 (viewing reference) of the 3D shape 623. In use, the clinician may adjust the orientation of the ultrasound imaging probe 160 to view the 3D shape 623 from a viewing reference other than the front view of the 3D shape 623, such as a side view, for example.

In some embodiments, the shape imaging logic may enhance a stability of the image of the shape 3D shape 623. As the position and orientation of the shape 3D shape 623 is determined by the shape imaging logic 195 (i.e., known by the system) along with the position and orientation of the reference plane 630, the shape imaging logic 195 may effectively link the image of the shape 3D shape 623 to the ultrasound image 651 as defined by the reference plane 630. By linking the image of the shape 3D shape 623 to the ultrasound image 651, the shape imaging logic 195 may enhance a stability of the image of the shape 3D shape 623 on the display 170. For example, in an instance where the ultrasound imaging probe 160 is moved, the shape imaging logic 195 may move the image of the shape 3D shape 623 accordingly so that the position of the image of the shape 3D shape 623 is effectively fixed on the display 170.

Figure 7:
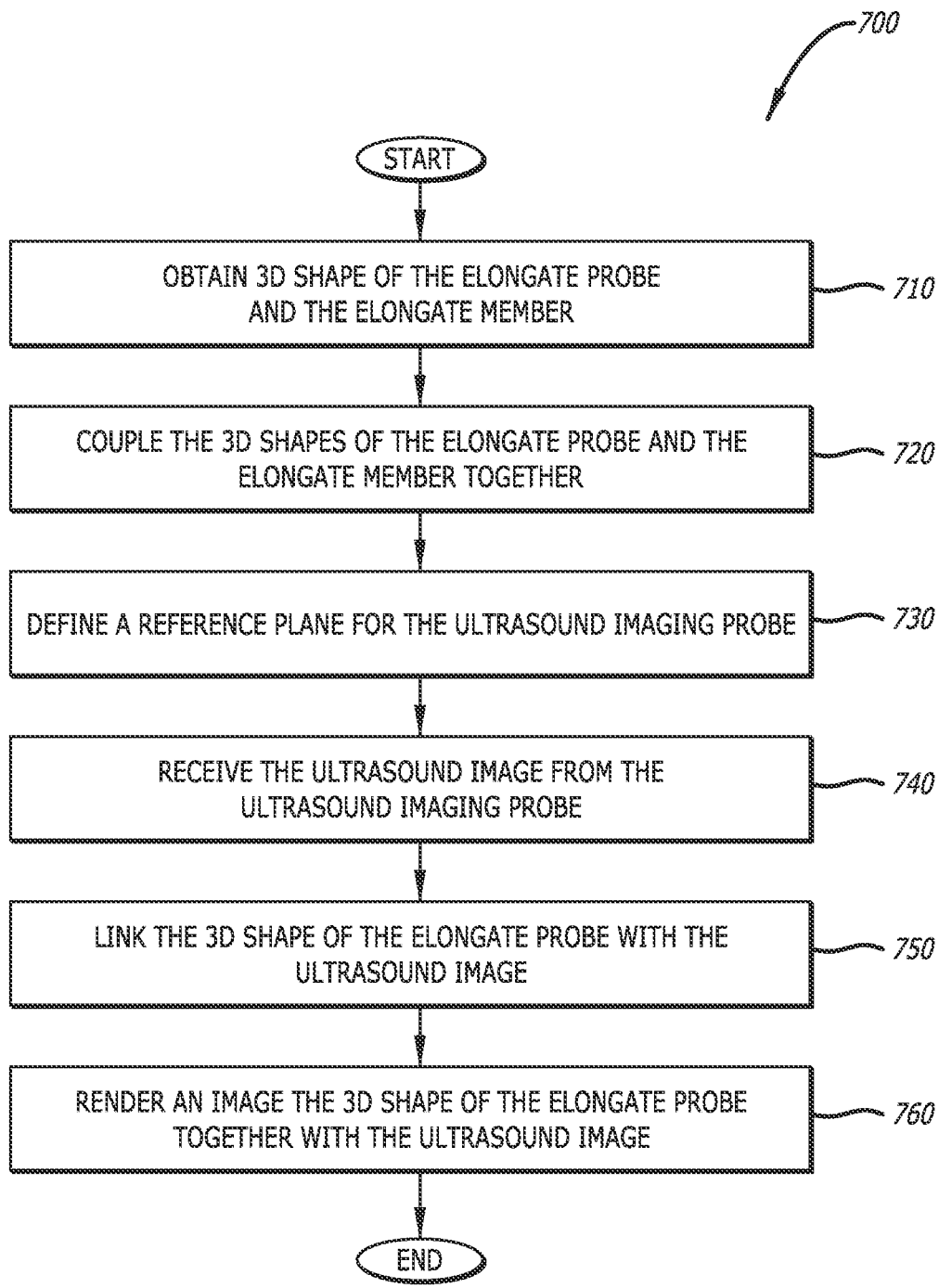
FIG. 7 is a flowchart of methods of operations conducted by the medical instrument monitoring system of FIG. 1 for defining and rendering images of the 3D shape of the elongate probe in combination with an ultrasound image.

Referring to FIG. 7, a flowchart of a method of operations conducted by the medical instrument monitoring system of FIG. 1 in determining 3D shapes of the elongate member and the elongate probe and rendering an image of the 3D shape of the elongate probe in combination with an ultrasound image is shown, in accordance with some embodiments. Each block illustrated in FIG. 7 represents an operation included in the method 700 of rendering an image of the elongate probe in alignment with the ultrasound image acquired from the ultrasound imaging probe. It should be understood that not every operation illustrated in FIG. 7 is required. It should be assumed that prior to the start of the method 700, the elongate member and the elongate probe including, or having disposed therein, a set of one or more optical fibers each including a plurality of sensors, e.g., FBG sensors, that have detected axial strain on a corresponding optical fiber, received incident light, altered the characteristics of the incident light and reflected altered light signals back to a console and that the shape sensing logic has determined a 3D shape for each of the elongate member and the elongate probe.

The method 700 begins when the shape imaging logic obtains 3D shapes for the elongate member and the elongate probe from the shape sensing logic (block 710). The shape imaging logic couples the 3D shape of the elongate member (first 3D shape) with the 3D shape of the elongate member (second 3D shape) to define the spatial relationship between the first and second 3D shapes (block 720). With the first and second 3D shapes coupled together, the shape imaging logic may determine the position and orientation of a distal end of the elongate probe with respect to the position and orientation of the ultrasound imaging probe which is attached to the elongate member at the distal end of the elongate member.

The method 700 further includes defining a reference plane for the ultrasound imaging probe (block 730). As the attachment of the elongate member to the ultrasound imaging probe includes a bend in the elongate member the shape imaging logic define a reference plane in accordance with the bend using known geometrical techniques, such as three points disposed along the bend. The reference plane serves a viewing reference point for images rendered on the display, including images of the second 3D shape as well as ultrasound images. In some embodiment, the shape imaging logic may define the reference plane in parallel with the housing of the ultrasound imaging probe and the ultrasound image plane so that the orientation of the second 3D shape is linked the orientation of the ultrasound imaging probe. The shape imaging logic receives an ultrasound image from the ultrasound imaging probe (block 740) and prepares the second 3D shape for rendering an image thereof on the display. The shape imaging logic links (e.g., correlates) the image of the second 3D shape with the ultrasound image so that the orientation of the second 3D shape as rendered on the display is coupled with the orientation of the ultrasound image (block 750). For example, the shape imaging logic may associate the first 3D shape, the second 3D shape and each's positioning/orientation with a common reference plane; thus, the shape imaging logic may correlate image data received from the elongate probe with that received from the elongate member. With the image of the second 3D shape linked with the ultrasound image, the shape imaging logic may render the image of the second 3D shape in combination with the ultrasound image (block 760). In some embodiments, the shape imaging logic may render the image of the second 3D shape on top of (i.e., in front of) the ultrasound image.

Figure 8:
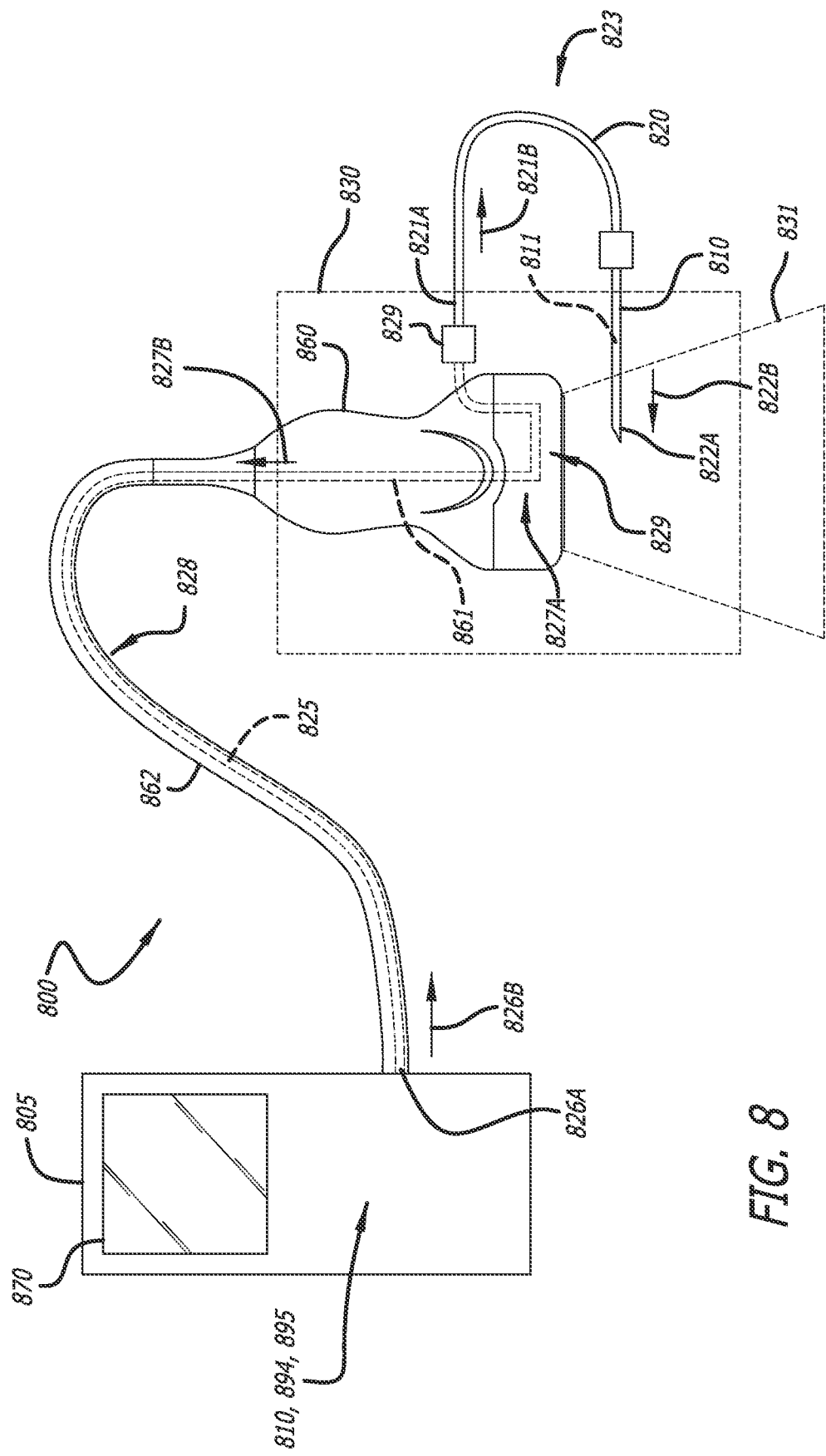
FIG. 8 illustrates a second embodiment of the system of FIG. 1, in accordance with some embodiments.

FIG. 8 illustrates second embodiment of a medical instrument placement system 800 that can, in certain respects, resemble components of the medical instrument placement system 100 described in connection with FIGS. 1-7. It will be appreciated that the illustrated embodiments may have analogous features. Accordingly, like features are designated with like reference numerals, with a leading digit of "8." For instance, the elongate probe is designated as "120" in FIGS. 1-7, and an analogous elongate probe is designated as "820" in FIG. 8. Relevant disclosure set forth above regarding similarly identified features thus may not be repeated hereafter. Moreover, specific features of the medical instrument placement system 100 and related components shown in FIGS. 1-7 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the medical instrument placement system of FIG. 8. Any suitable combination of the features, and variations of the same, described with respect to the medical instrument placement system 100 and components illustrated in FIGS. 1-7 can be employed with the medical instrument placement system and components of FIG. 8, and vice versa.

The medical instrument placement system 800 includes the system module 805 connected to the ultrasound imaging probe 860 via the cable 862. The cable 862 includes the elongate member 825 incorporated therein providing optical coupling in addition to electrical coupling between the system module 805 and the ultrasound imaging probe 860. In some embodiments, the elongate member 825 may be separate from and extend along the cable 862. The system module 805 includes the console 810 and the console 810 includes shape sensing logic 894 and shape imaging logic 895. The elongate probe 820 is also coupled with the ultrasound imaging probe 860 at the connector 829 so that the elongate probe 820 is optically coupled with the elongate member 825. The connector 829 may also be configured to couple with more than one elongate probe 820 so that the ultrasound imaging probe 860 is coupleable with multiple medical instruments, so that the system 800 may facilitate the placement of the multiple medical instruments.

The elongate member 825 is physically attached (e.g., optically connected) to the system module 805 at a proximal end point 826A so that the elongate member 825 extends away from the system module 805 in a direction indicated by the unit vector 826B. The elongate member 825 is also physically attached to the ultrasound imaging probe 860 at a distal end point 827A so that the elongate member 825 extends away from the ultrasound imaging probe 860 in a direction indicated by the unit vector 827B. The shape sensing logic 894 determines a 3D shape 828 of the elongate member 825, and as such, the proximal and distal end points 826A, 827A of the elongate member 825 also represent the proximal and distal end points of the 3D shape 828. Similarly, the unit vectors 826B, 827B represent the direction of the 3D shape 828 at the proximal and distal end points of the 3D shape 828.

In similar fashion, the elongate probe 820 is physically attached to the ultrasound imaging probe 860 at a proximal end point 821A so that the elongate probe 820 extends away from the ultrasound imaging probe 860 in a direction indicated by the unit vector 821B. The elongate probe 820 defines a distal end point 822A and a direction of the elongate probe 820 at the distal end point 822A is indicated by the unit vector 822B. The shape sensing logic 894 determines a 3D shape 823 of the elongate probe 820, and as such, the proximal and distal end points 821A, 822A of the elongate probe 820 also represent the proximal and distal end points of the 3D shape 823. Similarly, the unit vectors 821B, 822B represent the direction of the 3D shape 823 at the proximal and distal end points of the 3D shape 823. In some embodiments, the elongate probe 820 may include a needle 810 at the distal end point 822A. Although not required, the needle 810 may include an integral optical fiber 811 optically coupled with the elongate probe 820 so that optical fiber 811 and the elongate probe 820 exchange optical data therebetween.

The elongate probe 820 at the proximal end point 821A is optically coupled with and physically attached to the elongate member 825 at the proximal end point 827A. The elongate probe 820 is also physically attached to the elongate member 825 so that the unit vector 821B is defined with respect to the unit vector 827B.

With the proximal end of the 3D shape 823 spatially fixed with respect to the distal end of the 3D shape 828, the shape imaging logic 895 may determine (e.g., determine from known dimensions of the elongate member 825 and the elongate probe 820) the position of the distal end point 822A with respect to the position of the distal end point 827A. Similarly, the shape sensing logic 894 may determine the direction of the unit vector 822B with respect to the direction of the unit vector 827B.

The elongate member 825 includes an optical fiber 861 integrated into the ultrasound imaging probe 860. The optical fiber 861 is optically coupled with the elongate member 825 such that optical fiber 861 and the elongate member 825 exchange optical data therebetween. The optical fiber 861 includes a known shape 829 adjacent the distal end point 827A. The shape imaging logic 895 may define a reference plane 830 in accordance with the known shape 829 via known geometric techniques (e.g., a plurality (three or more) points along the optical fiber 861). In some embodiments, the plane 830 may be aligned with (e.g., in parallel with) the ultrasound imaging probe 860 (e.g., a front side or a back side of the ultrasound imaging probe 860) and/or an image plane 831 of the ultrasound imaging probe 860.

Figure 9:
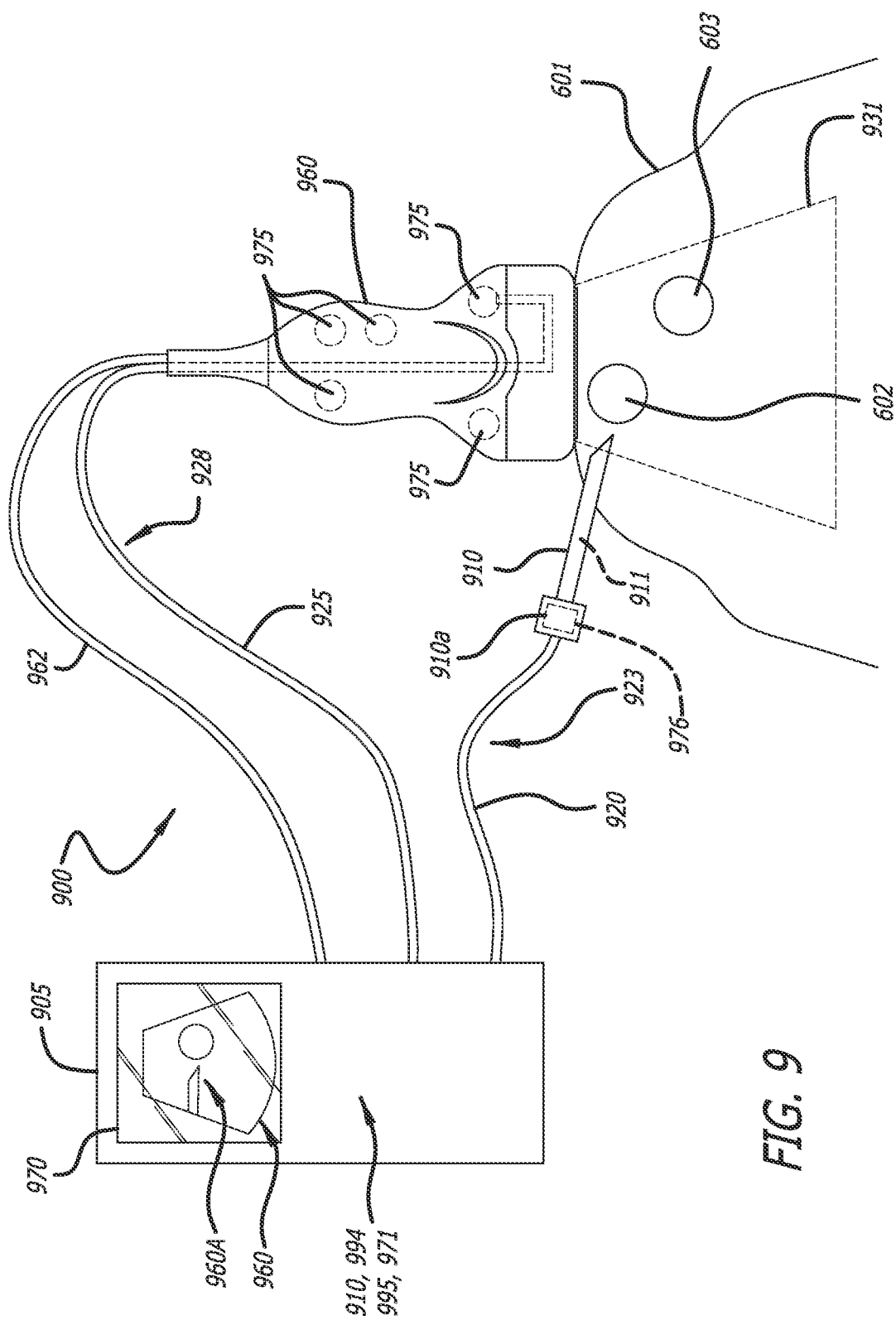
FIG. 9 illustrates a third embodiment of the system of FIG. 1 including magnetic needle tracking, in accordance with some embodiments.

FIG. 9 illustrates a third embodiment of a medical instrument placement system 900 that can, in certain respects, resemble components of the medical instrument placement system 100, described in connection with FIGS. 1-7 or the system 800 described in connection with FIG. 8 where like features are designated with like reference numerals, with a leading digit of "9." Relevant disclosure set forth above regarding similarly identified features thus may not be repeated hereafter. Moreover, specific features of the medical instrument placement systems 100, 800 and related components shown in FIGS. 1-8 may not be shown or identified by a reference numeral in the drawings or specifically discussed in the written description that follows. In one embodiment, the system 900 may incorporate the teachings of U.S. Pat. No. 9,554,716 titled "Insertion Guidance system for Needles and Medical components" which is incorporated herein by reference in its entirety.

The medical instrument placement system 900 includes the system module 905 connected to the ultrasound imaging probe 960 via the cable 962. The system module 905 includes the console 910 and the console 910 includes shape sensing logic 994 and shape imaging logic 995 along with the processors 971.

The elongate member 925 extends between the system module 905 and the ultrasound imaging probe 960. The shape sensing logic 994 determines a 3D shape 928 of the elongate member 925. In similar fashion, the elongate probe 920 extends between the system module 905 (or the ultrasound imaging probe 960) and the needle 910. The shape sensing logic 994 determines a 3D shape 923 of the elongate probe 920. Although not required, the needle 810 may include an integral optical fiber 911 optically coupled with the elongate probe 920 so that the optical fiber 911 and the elongate probe 920 exchange optical data therebetween. In some embodiments, the elongate probe 920 and/or integral optical fiber 911 may be omitted from the system 900.

As seen in FIG. 9, the ultrasound imaging probe 960 includes a plurality of magnetic sensors 975 embedded within the housing of the ultrasound imaging probe 960. The sensors 975 are configured to detect a magnetic field associated with the needle 910 and enable the system 900 to track the needle 910. Though configured here as magnetic sensors, it is appreciated that the sensors 975 can be sensors of other types and configurations, as will be described. Also, though they are shown in FIG. 9 as included with the ultrasound imaging probe 960, the sensors 975 can be included in a component separate from the ultrasound imaging probe 960, such as a separate handheld device.

In the present embodiment, each of the sensors 975 includes three orthogonal sensor coils for enabling detection of a magnetic field in three spatial dimensions. Such three dimensional ("3D") magnetic sensors can be purchased, for example, from Honeywell Sensing and Control of Morristown, N.J. Further, the sensors 975 of the present embodiment are configured as Hall-effect sensors, though other types of magnetic sensors could be employed. Further, instead of 3D sensors, a plurality of one-dimensional magnetic sensors can be included and arranged as desired to achieve 1D, 2D, or 3D detection capability.

In the present embodiment, five sensors 975 are included in the ultrasound imaging probe 960 so as to enable detection of the needle 910 in not only the three spatial dimensions (i.e., X, Y, Z coordinate space), but also the pitch and yaw orientation of the needle itself. Note that in one embodiment, orthogonal sensing components of two or more of the sensors 975 enable the pitch and yaw attitude of the magnetic element 976, and thus the needle 910, to be determined. In other embodiments, fewer or more sensors can be employed in the sensor array. More generally, it is appreciated that the number, size, type, and placement of the sensors of the sensor array can vary from what is explicitly shown here.

As shown in FIG. 9, a magnetic element 976 is included with the hub 910A of the needle 910. The magnetic element 976 in the present embodiment is a permanent magnet, including a ferromagnetic substance for instance. In some embodiments, the magnetic element 976 may be ring-shaped so as to define hole aligned with the lumen of the needle 910. So configured, the magnetic element 976 produces a magnetic field that is detectable by the sensors 975 of the ultrasound imaging probe 960 so as to enable the location, orientation, and movement of the needle 910 to be tracked by the system 900, as described further below. In other embodiments, it is appreciated that many other types, numbers, and sizes of magnetic elements can be employed with the needle 910 or other medical component to enable tracking thereof by the present guidance system.

As mentioned above, the system 900 in the present embodiment is configured to detect the position, orientation, and movement of the needle 910 described above. In particular, the sensors 975 of the ultrasound imaging probe 960 are configured to detect a magnetic field of the magnetic element 976 included with the needle 910. The sensors 975 are arranged spatially detect the magnetic element 976 in three-dimensional space. Thus, during operation of the system 900, magnetic field strength data of the needle's magnetic element 976 sensed by each of the sensors 975 is forwarded to the processors 971, such as the processors 971 of the console 910, which computes in real-time the position and/or orientation of the magnetic element 976. In one embodiment, the magnetic element 976 can be tracked using the teachings of one or more of the following U.S. Pat. Nos. 5,775,322; 5,879,297; 6,129,668; 6,216,028; and 6,263,230. The contents of the afore-mentioned U.S. patents are incorporated herein by reference in their entireties.

The sensors 975 are configured to continuously detect the magnetic field of the magnetic element 976 of the needle 910 during operation of the system 900. This enables the system 900 to continuously update the position and orientation of a needle image 960A for depiction on the display 970. Thus, advancement or other movement of the needle 910 is depicted in real-time by the needle image 960A on the display 970. Note that the system 900 is capable of continuously updating both the ultrasound image 960 and the needle image 960A on the display 970 as movements of the ultrasound imaging probe 960 and the needle 910 occur during a placement procedure or other activity.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A medical system comprising:
   an ultrasound imaging probe having a first optical fiber integrated therein, wherein:
   the first optical fiber within the ultrasound imaging probe includes a known static reference shape having one or more curves, and
   the known static reference shape defines a reference plane that is disposed in a fixed aligned relationship with an image plane of the ultrasound imaging probe;
   a first elongate member defining a first proximal end and a first distal end, the first elongate member including a second optical fiber extending along the first elongate member from the first proximal end to the first distal end, and the ultrasound imaging probe coupled with the first elongate member at the first distal end,
   wherein the first proximal end is coupled with a system module of the medical system at a defined first endpoint location and the first elongate member extends away from the system module along a defined first direction vector;
   a second elongate member defining a second proximal end and a second distal end, the second elongate member including:
   a third optical fiber extending along the second elongate member from the second proximal end to the second distal end; and
   a medical device coupled with the second elongate member at the second distal end,
   wherein the second proximal end is coupled with the system module at a defined second endpoint location and the second elongate member extends away from the system module along a defined second direction vector;
   wherein:
   the first optical fiber includes one or more first core fibers, each of the one or more first core fibers including a first plurality of sensors distributed along a longitudinal length of the first optical fiber,
   the second optical fiber includes one or more second core fibers, each of the one or more second core fibers including a second plurality of sensors distributed along a longitudinal length of the second optical fiber,
   the third optical fiber includes one or more third core fibers, each of the one or more third core fibers including a third plurality of sensors distributed along a longitudinal length of the third optical fiber, and
   each sensor of the first, second, and third pluralities of sensors is configured to (i) reflect a light signal of a different spectral width based on received incident light, and (ii) change a characteristic of the reflected light signal based on strain experienced by each respective core fiber; and
   the system module including a console, wherein:
   the first proximal end and the second proximal end are physically coupled with the system module such that the defined first endpoint location and the defined first direction vector are defined with respect to the defined second endpoint location and the defined second direction vector, and
   the console is optically coupled with the ultrasound imaging probe via the first elongate member and the medical device via the second elongate member, the console including one or more processors and a non-transitory computer-readable medium having stored thereon logic that, when executed by the one or more processors, causes operations including:
   providing the received incident light to the first, second, and third optical fibers;
   receiving reflected light signals of different spectral widths of the received incident light from the first, second, and third pluralities of sensors;
   processing the reflected light signals received from the first and the second plurality of sensors to determine a first three-dimensional (3D) shape extending along at least portions of the longitudinal length of the first optical fiber and the longitudinal length of the second optical fiber;
   determining a positioning of the ultrasound imaging probe based at least on the reflected light signals received from the second plurality of sensors;
   processing the reflected light signals received from the third plurality of sensors to determine a second 3D shape extending along at least portions of the longitudinal length of the third optical fiber;
   determining a position of the medical device with respect to the ultrasound imaging probe using the first 3D shape, the second 3D shape, the defined first endpoint location, the defined first direction vector, the defined second endpoint location, and the defined second direction vector;
   determining an orientation of the reference plane based on the reflected light signals received from the first plurality of sensors; and
   causing rendering of an image on a display of the medical system in accordance with the positioning of the ultrasound imaging probe and the reference plane, wherein the image includes at least one of an ultrasound image of a patient or a representation of the patient.

2. The medical system according to claim 1, wherein the operations further include:
   determining a positioning and an orientation of the second 3D shape with respect to the reference plane thereby determining an orientation of the second elongate member relative to the orientation of the ultrasound imaging probe; and
   causing rendering of an image of the second 3D shape within the image on the display of the medical system in accordance with the positioning and the orientation of the second 3D shape.

3. The medical system according to claim 1, wherein in use, an orientation of the ultrasound imaging probe is manipulated to adjust an orientation of a viewing reference.

4. The medical system according to claim 1, wherein the operations further include causing rendering of a visual indication of a target blood vessel within the image.

5. The medical system according to claim 1, wherein the operations further include using known dimensions of both the first elongate member and the second elongate member to determine the position of the medical device with respect to the ultrasound imaging probe.

6. The medical system according to claim 2, wherein the operations further include:

receiving the ultrasound image from the ultrasound imaging probe, and
causing rendering of the image of the second 3D shape on the display of the medical system to include a portion of a patient body based on the ultrasound image.

7. The medical system according to claim 2, wherein the medical device is an intravascular device including a fourth optical fiber integrated therein, the fourth optical fiber having a fourth plurality of sensors, wherein the fourth optical fiber is configured to receive a third incident light signal and provide fourth reflected light signals to the console, and wherein the operations further include determining the positioning and the orientation of the second 3D shape in the reference plane based at least in part on the fourth reflected light signals.

8. The medical system according to claim 7, wherein the intravascular device includes one or more of a catheter, a stylet, a needle, or a guidewire.

9. A method for detecting placement of a medical device within a patient, the method comprising:
providing an incident light to:
a second optical fiber and a first optical fiber via a first elongate member, the first elongate member defining a first proximal end and a first distal end; and
a third optical fiber via a second elongate member, the second elongate member defining a second proximal end and a second distal end,
wherein:
the first optical fiber is integrated into an ultrasound imaging probe of a medical system, wherein:
the first optical fiber within the ultrasound imaging probe includes a known static reference shape having one or more curves, and
the known static reference shape defines a reference plane that is disposed in a fixed aligned relationship with an image plane of the ultrasound imaging probe;
the second optical fiber extends along the first elongate member from the first proximal end to the first distal end, the first elongate member coupled with the ultrasound imaging probe at the first distal end,
wherein the first proximal end is coupled with a system module of the medical system at a defined first endpoint location and the first elongate member extends away from the system module along a defined first direction vector,
the third optical fiber extends along the second elongate member from the second proximal end of the second elongate member to the second distal end of the second elongate member, the second elongate member coupled with the medical device at the second distal end,
wherein:
the second proximal end is coupled with the system module at a defined second endpoint location and the second elongate member extends away from the system module along a defined second direction vector, and
the first proximal end and the second proximal end are physically coupled with the system module such that the defined first endpoint location and the defined first direction vector are defined with respect to the defined second endpoint location and the defined second direction vector,
the first optical fiber includes one or more first core fibers, the one or more first core fibers including a first plurality of sensors distributed along a longitudinal length of the first optical fiber,
the second optical fiber includes one or more second core fibers, the one or more second core fibers including a second plurality of sensors distributed along a longitudinal length of the second optical fiber,
the third optical fiber includes one or more third core fibers, the one or more third core fibers including a third plurality of sensors distributed along a longitudinal length of the third optical fiber, and
each sensor of the first, second, and third pluralities of sensors is configured to (i) reflect a light signal of a different spectral width based on received incident light, and (ii) change a characteristic of the reflected light signals based on strain experienced by the first, second, and third optical fibers, respectively;
providing by a console of the medical system the incident light to the first, second, and third optical fibers,
receiving by the console, reflected light signals of different spectral widths of the incident light from the first, second, and third pluralities of sensors;
processing in accordance with logic of the medical system, the reflected light signals to determine;
a first three-dimensional (3D) shape extending along at least portions of the longitudinal length of the first optical fiber and the longitudinal length of the second optical fiber;
a second 3D shape extending along at least a portion of the longitudinal length of the third optical fiber; and
determining a position of the ultrasound imaging probe based on the second 3D shape;
determining an orientation of the reference plane based on the first 3D shape;
determining a position of the medical device with respect to the ultrasound imaging probe using the first 3D shape, the second 3D shape, the defined first endpoint location, the defined first direction vector, the defined second endpoint location, and the defined second direction vector; and
causing rendering of an image on a display of the medical system in accordance with the position of the ultrasound imaging probe and the reference plane, wherein the image includes at least one of an ultrasound image of the patient or a representation of the patient.

10. The method according to claim 9, further comprising:
determining a positioning and an orientation of the second 3D shape in the reference plane thereby determining an orientation of the second elongate member relative to the orientation of the ultrasound imaging probe; and
causing rendering of an image of the second 3D shape within the image on the display of the medical system in accordance with the positioning and the orientation of the second 3D shape.

11. The method according to claim 9, further comprising causing rendering of a visual indication of a target blood vessel within the image.

12. The method according to claim 9, further comprising adjusting an orientation of a viewing reference when in use, wherein an orientation of the ultrasound imaging probe is manipulated.

13. The method according to claim 9, further comprising using known dimensions of both the first elongate member and the second elongate member to determine the position of the medical device with respect to the ultrasound imaging probe.

14. The method according to claim 10, further comprising:
- receiving the ultrasound image from the ultrasound imaging probe, and
- causing rendering of the image of the second 3D shape on the display of the medical system to include a portion of a patient body based on the ultrasound image.

15. The method according to claim 10, wherein the medical device is an intravascular device including a fourth optical fiber integrated therein, the fourth optical fiber having a fourth plurality of sensors, wherein the fourth optical fiber is configured to receive the incident light and provide fourth reflected light signals to the console, and wherein operations further include determining the positioning and the orientation of the second 3D shape in the reference plane based at least in part on the fourth reflected light signals.

16. The method according to claim 15, wherein the intravascular device includes one or more of a catheter, a stylet, a needle, or a guidewire.

\* \* \* \* \*